United States Patent [19]

Black

[11] 4,017,391
[45] Apr. 12, 1977

[54] WATER TREATMENT SYSTEM

[76] Inventor: Alvin P. Black, 1717 NW. 23rd Ave, Unit 3"b", Gainesville, Fla. 32601

[22] Filed: July 6, 1976

[21] Appl. No.: 702,954

Related U.S. Application Data

[63] Continuation of Ser. No. 418,896, Nov. 26, 1973, abandoned, which is a continuation of Ser. No. 258,369, May 31, 1972, abandoned, which is a continuation-in-part of Ser. No. 136,094, April 21, 1971, abandoned.

[52] U.S. Cl. .................................. 210/44; 210/45; 210/48; 210/52; 210/60; 210/61; 210/67; 210/73 R; 423/164; 423/165; 423/175; 423/432
[51] Int. Cl.² ........................................ C02B 1/22
[58] Field of Search .............. 210/42 R, 44, 60, 45, 210/47, 48, 49, 50, 51, 52, 53, 59, 65, 66–69, 73 R, 199, 61; 423/158, 160, 164, 165, 175, 430, 432, 637

[56] References Cited

UNITED STATES PATENTS

| | | | |
|---|---|---|---|
| 2,359,748 | 10/1944 | Clemens | 210/45 |
| 2,390,095 | 12/1945 | Gloss | 210/47 |
| 2,581,719 | 1/1952 | Schoenlaub | 423/165 |
| 3,262,877 | 7/1966 | Le Compte | 210/47 |

OTHER PUBLICATIONS

Mulbarger et al.; "Lime Clarification, Recovery, Reuse and Sludge Dewatering Characteristics"; Journal W.P.C.F. vol. 41, No. 12, (Dec. 1969), pp. 2070-2085.
LeCompte A. R.; "Water Reclamaton by Excess Lime Treatment Of Effluent"; TAPPI vol. 49, No. 12, (Dec. 1966), pp. 121-124.
Doerner et al.; "The Bicarbonate Process For The Production of Magnesium Oxide"; Technical Paper No. 684, Bureau of Mines.

Primary Examiner—Frank A. Spear, Jr.
Assistant Examiner—Benoît Castel
Attorney, Agent, or Firm—George H. Baldwin; Arthur G. Yeager

[57] ABSTRACT

Chemical and aqueous components of sludge derived from lime treatments of raw water supplies are recovered by procedures involving carbonation of the sludges to effect a phase separation between magnesium and calcium components. When the magnesium content of the raw water is intolerable in the treated water, a magnesium carbonate is recovered from the liquid phase by its decarbonation, and the aqueous component of the liquid phase is recycled to recover the water values of the treated sludge. When the magnesium content of the raw water can be tolerated in the treated water, the liquid phase magnesium bicarbonate solution is recycled to the water treatment plant. Turbidity factors separated with the sludges remain with the insoluble calcium carbonate that is separated from the liquid phase and by avoiding conventional coagulants other than magnesium hydroxide in the treatment of the raw water, turbidity and calcium carbonate components can be separated as by conventional froth flotation procedures to recover a quality lime product. Special procedures are used in the carbonation step when flue gases are used for sludge carbonation purposes so as to avoid contamination of recovered lime with magnesium values and special procedures are advocated in the treatment of soft turbid water supplies as well as high magnesium turbid water supplies to avoid disposal of environmental contaminating chemical flocculants such as alum.

39 Claims, 5 Drawing Figures

WATER TREATMENT SYSTEM

RELATED APPLICATION

This is a continuation of application Ser. No. 418,896 filed Nov. 26, 1973, which was a continuation of application Ser. No. 258,369 filed May 31, 1972, which was a continuation-in-part of application Ser. No. 136,094 filed Apr. 21, 1971, of which a continuation application Ser. No. 325,805 was filed on Jan. 26, 1973, all of said applications now abandoned.

BACKGROUND OF THE INVENTION

This invention relates to the treatment of raw water supplies such as those used by municipalities and industries as a source of fresh water and has to do with the removal of turbidity factors and coloring matter from such supplies and also with the recovery of waste water and chemical values that are commonly discarded as waste products of the treatments accorded such supplies.

Some of the raw water supplies used by industries and municipalities, although having hardness levels which are tolerable for the intended uses, nevertheless have entrained clay and other factors of turbidity which, along with organic coloring matter, must be removed before use as a fresh water source. This is commonly done by settling and filtering procedures which involve the use of a suitable coagulant such as alum. The sludges obtained by the settling procedures are mainly composed of water, clay and the coagulant used in the treatment, and the disposal of such sludges has caused pollution problems, mainly because of the contained coagulant. The water content of the sludge is, of course, lost with the disposal of the sludge as such there is a need for procedures in such instances which would avoid environmental contamination by the coagulants used in settling the undesirable turbidity factors. Some of these raw water supplies having what may be considered as a "tolerable" hardness level actually have such a low level of hardness as to provide an environment for the excessive corrosion of equipment used in their handling. Therefore it would also be advantageous in such cases to raise the hardness level by the treatment accorded the supply.

Yet other raw water supplies have such a high level of temporary and/or permanent hardness as to require softening before use as a fresh water source. The lime treatment processes, such as the lime-soda process, are widely used for such purposes but there are certain waste disposal problems which accompany their use. The lime treatments, for example, produce a waste aqueous sludge of coprecipitated calcium carbonate and magnesium hydroxide that also contains any insoluble turbidity factors as are present in the raw water supply. In many areas this aqueous sludge is merely passed to a local body of water in which it serves as an environmental pollutant. In other areas, the sludges are collected in lagoons and other outdoor storage areas where throughout the years they have progressively taken up more and more valuable land areas. Alum and/or other coagulants are also usually used in carrying the lime processes into practice, and these coagulants and the magnesium values of the aqueous sludges also create problems of pollution in the vicinity of the storage areas due to water runoff. Since sizable amounts of treated water are lost with the disposal of the aqueous sludges along with quantities of calcium and magnesium chemicals, it would be desirable if procedures were available for eliminating or reducing the disposal problem and for recovering the valuable sludge components.

A few water treatment systems have been equipped with sludge treatment facilities for recovering a reusable and marketable lime product. The procedures used at the sludge treatment facilities involve the carbonation of the sludge to effect a phase separation between the calcium and magnesium values. The magnesium hydroxide component of the sludge is solubilized by the carbonation procedure to provide a solute of magnesium bicarbonate in the aqueous component of the sludge. The liquid phase is then separated from the residual insolubles and is disposed of as a by-product waste material while the residual insolubles are calcined to recover a lime product that is reusable in the water treatment process and also available for sale on the open market when the recovered amounts exceed the recycled lime requirements of the softening procedure. The disposal of the carbonated liquor, however, creates a pollution problem of concern to ecologists, and it also accounts for losses of potentially valuable sludge components. It would accordingly be desirable if procedures existed for the recovery of the water and magnesium components of such by-product waste.

The sludge treatment procedure for recovering the calcium values has heretofore been limited to the treatment of sludges obtained from the softening of raw waters that are basically free of turbidity factors. Clay and other turbidity factors present in the raw waters are separated as components of the sludges and carry through the sludge treatment steps with the insoluble calcium carbonate. The clay ultimately appears as a contaminant in the recovered lime product. This limits the recycled use of any recovered lime product to amounts consistent with a tolerable buildup of the recycled turbidity factors. The recovery of lime from sludges containing appreciable amounts of clay would therefore necessitate the use of large amounts of uncontaminated makeup lime for the softening procedures and would result in a low quality lime by-product having limited use in the market areas. As such, there is a need for calcium recovery procedures which provide a quality lime product and which can be used in conjunction with the treatment of sludges obtained from the softening of turbid raw water supplies.

The calcium recovery procedures currently in use have also experienced difficulty in separating the magnesium values from the calcium values. The insoluble calcium carbonate which is separated from the carbonated liquor contains magnesium values that become dead burn when the insoluble products are calcined. The recycle and reuse of this lime product is accordingly also limited by the tolerable buildup of dead burn magnesite which accompanies the recycling procedures, and needless to say the magnesite inclusion in the calcined product also limits the open market usage of the recovered product. There is accordingly a need for improved procedures for separating the magnesium and calcium values in the recovery systems.

STATEMENT OF THE INVENTION

The invention relates to the treatment of raw water supplies and has to do with the treatment of aqueous sludges containing coprecipitated magnesium and calcium values. Such sludges may be obtained as a consequence of procedures advocated herein for the treatment of turbid raw water supplies which are normally considered to provide naturally soft, fresh water sources but are normally obtained as waste by-products of hard water softening procedures utilizing lime (CaO) for precipitating the hardness factors of the raw water supply. Such sludges are produced as a consequence of the straight lime treatment of hard water supplies to remove the carbonate hardness factors and are also produced as a consequence of the lime-soda treatment of raw water supplies to remove both the carbonate and noncarbonate hardness factors.

Certain aspects of the invention are directed to a system for treating relatively soft and turbid raw water supplies for the removal of the turbidity factors. In accord with these aspects of the invention, magnesium hydroxide is formed in situ in the soft water supply to serve as the coagulant for the flocculation of the turbidity factors in lieu of the use of coagulants that would otherwise provide environmental pollutants when the clay and other turbidity factors are disposed of. The sludge obtained as a consequence of the raw water treatment is then carbonated to facilitate the recovery of a magnesium bicarbonate solution which is then recycled to the raw water treatment facility to recover the water values and simultaneously provide a reactant with lime for the in situ formation of the coagulant. The treatment of such raw water supplies with calcium and magnesium reactants productive of coagulating magnesium hydroxide will normally increase the residual hardness of the water, and make up magnesium to provide the desired amount of coagulant may be added in the recycle system as a hydrated magnesium carbonate or in some other suitable reactive form. The insoluble calcium carbonate and turbidity factors remaining from the carbonation treatment are of course separated from the liquid phase prior to the recycle of the carbonated liquor, and may be discarded as land fill substantially free of chemical pollutants. In those situations where the water treatment facilities are of a size warranting expenditures for the recovery of a lime product that may be recycled for use in forming the coagulant, the mixture of calcium carbonate and turbidity factors may be treated in accord with other aspects of the invention to be subsequently described.

Other aspects of the invention have to do with systems for recovering the water and magnesium contents of the sludges containing the coprecipitated components. The sludges in such cases are carbonated with carbon dioxide from a suitable source to effect a phase separation between the magnesium values on the one hand and the residual insoluble components of the sludge on the other hand. Following separation of the residual insolubles and the carbonated liquor, the liquid phase is either recycled and mixed with the raw water supply to directly recover the aqueous and magnesium components of the sludge in the raw water treatment facilities, or is further treated to recover a marketable magnesium product. The further treatment includes a decarbonation step and the water content of the decarbonated liquor is recycled within the system by recycling procedures that are primarily dependent upon the magnesium product which is recovered. Overall, the specific procedure used for recovering the aqueous and magnesium components of the sludge is generally determined by the character (i.e. magnesium content) of the raw water supply, the size of the water treatment plant operation, and the magnesium product demands of the open market as will be subsequently evident to those skilled in the art.

Still other aspects of the invention have to do with systems for recovering calcium values from sludges obtained as a consequence of the lime treatments of turbid raw water supplies. Such sludges, in addition to containing coprecipitated calcium carbonate and magnesium hydroxide, also contain turbidity factors which, as previously indicated, end up as contamination in the calcined lime product. In accord with these aspects of the invention, the aqueous sludge is carbonated to provide the desired phase separation but the use of alum and other conventional coagulants as aids to the flocculation and settling of the insolubles during the water treatment procedures is avoided. Such coagulants interfere with the physical separation of the respective components of the insolubles remaining from the carbonation treatment accorded the sludge. In lieu of such coagulants, magnesium hydroxide, as formed in situ during the raw water treatment procedure, is permitted to serve as a flocculating aid. Thereafter when the sludge is carbonated, the coagulant is destroyed and the insolubles remaining after the carbonation procedure are free of alum and other coagulants that would otherwise interfere with the physical separation of the insoluble turbidity and calcium carbonate components of the solids obtained through separation of the phases. The turbidity and calcium carbonate components of the residual solids are then separated by procedures that preferably involve froth flotation. The calcium carbonate is then calcined to provide a recovered lime product while the separated turbidity factors may be discarded as waste material substantially free of potential environmental contaminants.

Still other aspects of the invention also have to do with the recovery of calcium values from such sludges but are directed to improved carbonation and subsequent handling procedures which materially reduce the magnesite contamination of any recovered lime product. These aspects of the invention contemplate the use of flue gases for the sludge carbonation step and the use of substantially atmospheric pressure conditions during the carbonation reaction so as to utilize a readily available source of carbon dioxide and to avoid the use of expensive pressurized equipment and procedures for handling the sludge. The carbonation step in accord with these aspects of the invention is carried out in a plurality of series connected treatment zones to which flue gases are introduced and withdrawn, and the sludge is incrementally fed to the zones in proportions which diminish along the flow path of the sludge through the series connected arrangement. As will be subsequently seen, by controlling the magnesium content of the sludge that is subjected to carbonation and by closely controlling the temperature conditions during the carbonation and subsequent phase separation steps, the magnesite contamination of any recovered lime product can be materially reduced.

Other aspects of the invention will become apparent from the detailed disclosure which follows.

A general object of the invention is to provide improved procedures for treating raw water supplies to eliminate or reduce environmental pollution due to the treatment accorded such supplies. One particular object is to provide improved procedures for recovering chemical and water values from sludge by-products of the lime and lime-soda treatment of water supplies. Another object is to provide improved procedures for recovering chemical values from the normally waste sludges obtained from the softening of hard water supplies. Another object is to provide procedures for recovering both the magnesium and calcium values from normally waste sludge by-products of the softening of hard water as well as for recovering aqueous components of such sludges. Yet another object of the invention is to provide improved procedures for treating turbid raw water supplies. One objective is to provide improved procedures for treating normally waste sludges and which substantially avoid the need for disposing of chemical values constituting environmental contaminants. Another object is to provide improved procedures for recovering calcium values from sludges obtained as a consequence of the lime treatments of turbid raw water supplies. Still another object is to provide waste sludge treatment procedures which permit the recovery from the waste material of lime products that are low in contaminating magnesium and/or turbidity factors. Still another object is to provide improved methods for carbonating and handling waste sludge products to the end that a better separation of the magnesium and calcium values of the sludges may be obtained. Still a further object is to provide procedures for treating turbid raw water supplies having tolerable hardness levels and which avoid the need for using alum and other coagulants which become environmental pollutants when the turbidity factors are disposed of.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

DETAILED DESCRIPTION OF THE INVENTION

Figure 1:
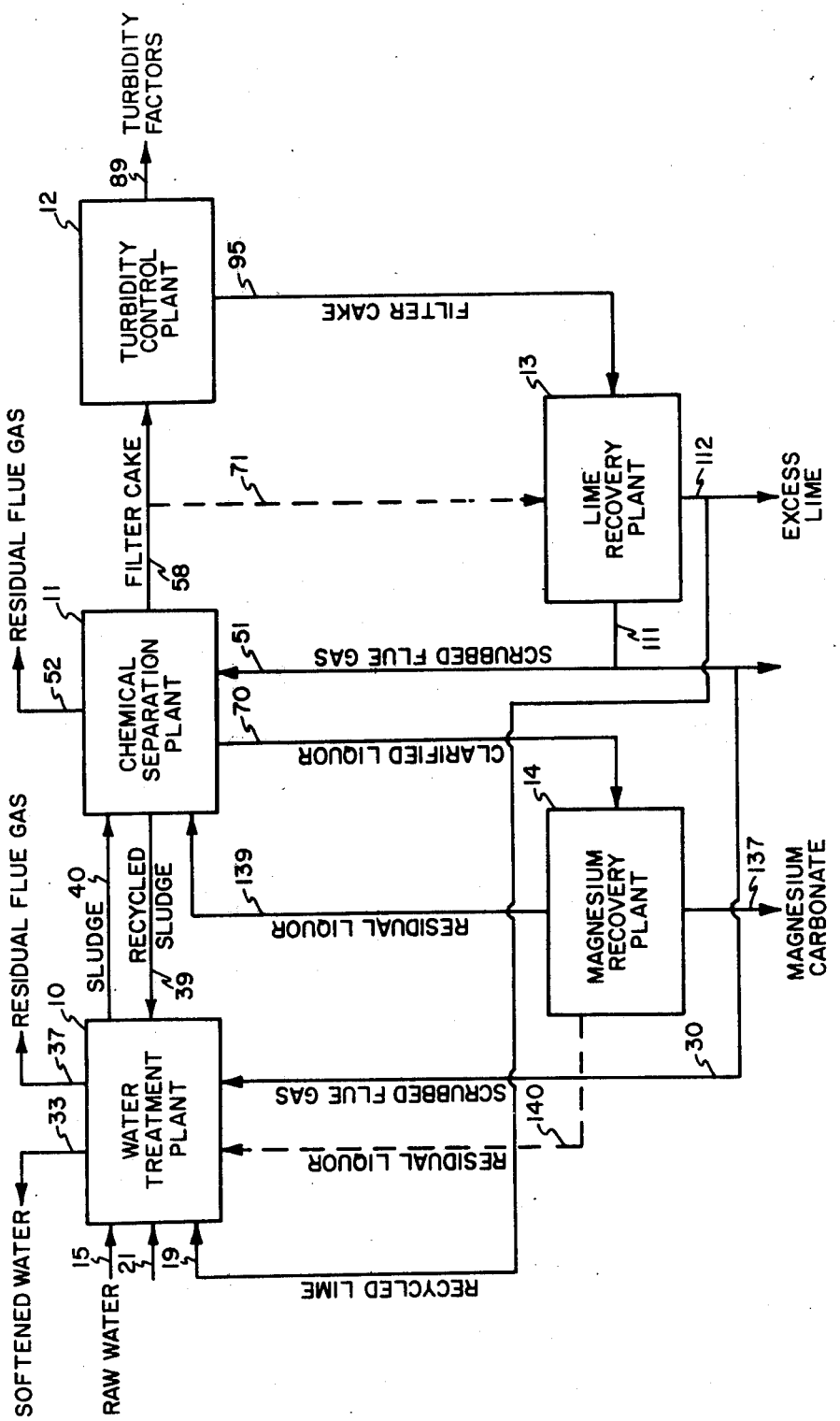
FIG. 1 diagrammatically illustrates the flow of materials between the plant components of a system for treating in accord with the lime-soda process of softening raw waters a turbid raw water supply having an intolerable high magnesium content and for recovering the chemical values and aqueous components of the normally waste sludge apart from the turbid components of the sludge, the diagram further illustrating certain optional procedures available to accommodate the treatment of a similar hard water supply which is basically nonturbid, and other optional procedures available to accommodate the recovery of a basic magnesium carbonate.

The invention has to do with the recovery of chemical values and the water content of aqueous sludges containing coprecipitated calcium carbonate and magnesium hydroxide. These sludges are obtained by water treatment procedures utilizing lime as a reactant. Sludges of this type are commonly considered waste by-products of water softening procedures utilizing lime as a reactant, the straight lime process and the lime-soda process of treating hard waters being exemplary of water treatment procedures from which such sludges are obtainable. However, such sludges may also be derived, as will be subsequently seen, by water treatment procedures designed primarily for the removal of turbidity factors in contrast to water softening and which involve the in situ formation of magnesium hydroxide and calcium carbonate through the addition to the raw waters of suitable reactants capable of forming the coprecipitated products.

The straight lime process for softening raw water supplies basically involves the addition of lime to the raw water to precipitate the carbonate hardness factors, while the lime-soda process involves the additional use of soda ash to precipitate the noncarbonate hardness factors.

The reactions involved in the formation of the aqueous sludges are exemplified by those that transpire in the lime-soda process in which the raw water is treated with lime in an amount exceeding the stoichiometric amount for precipitation of the carbonate hardness factors, as exemplified below by reactions (1) and (2) and the secondary reaction (3). The excess lime reacts with certain of the noncarbonate hardness factors, as exemplified by reaction (4), and the soda ash is used in stoichiometric amounts to remove the noncarbonate hardness factors, as illustrated by reaction (5) with respect to the product of reaction (4), and by reaction (6) with respect to the noncarbonate hardness factors in the form of soluble calcium sulfate.

$$Ca(HCO_3)_2 + Ca(OH)_2 \rightarrow 2CaCO_3 + 2H_2O \tag{1}$$

$$Mg(HCO_3)_2 + Ca(OH)_2 \rightarrow CaCO_3 + MgCO_3 + 2H_2O \tag{2}$$

$$MgCO_3 + Ca(OH)_2 \rightarrow CaCO_3 + Mg(OH)_2 \tag{3}$$

$$MgSO_4 + Ca(OH)_2 \rightarrow Mg(OH)_2 + CaSO_4 \tag{4}$$

$$CaSO_4 + Na_2CO_3 \rightarrow CaCO_3 + Na_2SO_4 \tag{5}$$

$$CaSO_4 + Na_2CO_3 \rightarrow CaCO_3 + Na_2SO_4 \tag{6}$$

The precipitates formed in practicing the lime-soda process are removed from the treated water along with any turbidity factors as solids components of an aqueous sludge which, although varying from one water treatment plant to another, will usually have a solids content ranging from about 2 to 8% solids. Water treatment practices utilizing the process vary somewhat in accord with local water conditions and available equipment, and in most cases it will be found that the entire water supply is subjected to the process. In other cases, however, only portions of the water supply are subjected to the softening treatment, and in such situations the chemical treatment is bypassed by a portion of the supply and then blended with the softened water to provide a treated fresh water source having a predetermined tolerable hardness level. Basically, however, all variations of the softening treatment processes provide for the removal of an aqueous sludge which may be treated in accord with the various aspects of the invention as will be evident to those skilled in the art from the following disclosure.

The various aspects of the invention contemplate a carbonation of the sludges to effect a phase separation between the calcium and magnesium values and in accord with certain aspects of the invention, scrubbed flue gases are used as a source of carbon dioxide for the carbonation treatment, whereas other aspects contemplate use of any suitable source of carbon dioxide such as those derived from flue gases, a $CO_2$ generating source or other sources readily apparent to those skilled in the art.

The solubilization of the magnesium hydroxide by the carbonation treatment proceeds as a two-step reaction exemplified by reactions (7) and (8) below. It is known that mangesium carbonate may be precipitated during the carbonation reaction in accord with equation (9) if the magnesium hydroxide is added to the system in an amount which exceeds its consumption rate in accord with reactions (7) and (8).

$$Mg(OH)_2 + CO_2 + H_2O \rightleftarrows MgCO_3 \cdot X\ H_2O \quad (7)$$

$$MgCO_3 \cdot X\ H_2O + 2CO_2 \rightleftarrows Mg(HCO_3)_2 + H_2O \quad (8)$$

$$Mg(HCO_3)_2 + Mg(OH)_2 + 4H_2O \rightleftarrows 2MgCO_3 \cdot 3H_2O \quad (9)$$

It is also known that solutions which are supersaturated with respect to magnesium values and from which magnesium carbonate precipitates in the presence of seed particles can be obtained by the carbonation of magnesium hydroxide slurries. The production of supersaturated solutions is desired in the ore benificiation art because equipment costs are roughly inversely related to the degree of magnesium solubilization obtained and losses due to such precipitation can be tolerated because the lost product accompanies the gangue and is accordingly disposed of with this waste material. In contrast to this, precipitation losses during the carbonation step, as applied to the recovery of calcium values from such sludges as are contemplated herein, merely serve to contaminate any lime product that is recovered from the insolubles remaining from the carbonation treatment.

Among the practical limitations that are imposed on calcium recovery procedures utilizing a sludge carbonation step in a raw water treatment system is the economical need to use flue gases derived from the lime kiln as a source of carbon dioxide and to also carry out the carbonation step at substantially atmospheric pressure conditions so as to use a cheap, readily available, carbon dioxide source and simultaneously avoid use of expensive pressurized equipment and the more costly operating procedures associated therewith. In the ore benificiation art, the use of flue gases and atmospheric pressure conditions has generally been avoided because the inert flue gas components have a tendency to strip carbon dioxide from the magnesium bicarbonate solutions, and it is also known that hydrated forms of magnesium carbonate may be precipitated by stripping the carbon dioxide from the aqueous solution in accord with equation (10).

$$Mg(HCO_3)_2 \xrightarrow[\text{air}]{H_2O} MgCO_3 \cdot 3H_2O + CO_2 \quad (10)$$

To avoid contamination of the recovered lime product with magnesium values when utilizing flue gases as a source of $CO_2$, the carbonation and phase separation steps are carried out, in accord with certain aspects of the invention, while maintaining the components of the system at a temperature in the range of between 15° and 21° C. In addition, the carbonation step is carried out under substantially atmospheric pressure conditions in a plurality of reaction zones that are series connected and to which the sludge is incrementally introduced in amounts which diminish along the flow path of the liquid through the zonal arrangement. The flue gases under such circumstances are introduced and mechanically dispersed in the sludge present in each zone and the residual gases remaining from the treatment accorded the sludge in the zone are withdrawn to the atmosphere without further contact with sludge in other zones. The production of supersaturated solutions is also avoided in accord with these aspects of the invention by limiting the magnesium content of the sludge that is subjected to the carbonation procedure to a value which is generally less than 6.5 grams per liter (as MgO).

Those aspects of the invention contemplating a recovery of calcium values from sludges derived as a consequence of the treatment of turbid raw water supplies also contemplate products of the carbonation step which are free of coagulants. Hence, the use of alum or other coagulants which are commonly employed for flocculating the precipitates in conventional water treatment practices is avoided and the coagulating effect of in situ formed magnesium hydroxide is relied on to flocculate the turbidity factors and other insolubles and to also occlude or otherwise adsorb the coloring matter present in the raw water supply. The carbonation of the sludge by effecting solubilization of the magnesium hydroxide serves to destroy the coagulant used for flocculation purposes by transforming it to a noncoagulating magnesium bicarbonate solute in the aqueous component of the sludge. Once the insolubles and liquid phase products of the carbonation step are separated, the insolubles are treated by conventional procedures to physically separate the calcium carbonate and turbid producing factors. In this respect, conventional froth flotation procedures are advocated for separating the turbidity factors and calcium carbonate. The amount of in situ formed magnesium hydroxide needed for flocculation purposes will, of course, vary from one water treatment facility to the next in accord with available or designed settling capacity and the character of the raw water being treated. However, the amount of magnesium hydroxide needed for flocculating purposes can be readily ascertained by conventional and well known settling test procedures. In those instances where the coagulant requirements exceed those attainable by the reaction of lime with the available magnesium content of the raw water supply and with recycled magnesium bicarbonate recovered in accord with procedures to be subsequently described, magnesium carbonate or some other suitable lime reactive magnesium source material may be used for make up purposes, as will be apparent to those skilled in the art.

Those aspects of the invention which are directed to recovering the magnesium values and water content of the aqueous sludges contemplate various recovery procedures that in most instances depend upon the magnesium content level of the raw water supply, the amount of magnesium hydroxide required for satisfactory flocculation purposes and the market demand for a recovered byproduct magnesium compound. In those instances where the raw water supply has a tolerable magnesium hardness level, the magnesium bicarbonate solution recovered as a consequence of the sludge carbonation step is recycled and mixed with the raw water supply. The water content of the separated aqueous sludge is accordingly recovered by the recycling procedure and the magnesium bicarbonate serves as a reactant with added lime to produce the magnesium hydroxide coagulant. On the other hand, when the raw water supply has an intolerably high magnesium content that requires a lime softening treatment to remove a part of the magnesium content, the magnesium bicarbonate solution which is produced by the sludge carbonation treatment is treated in accord with conventional decarbonation procedures to separate an insoluble normal or basic magnesium carbonate. The residual water content of the decarbonated liquor is then either recycled directly to the water treatment plant or recycled and reintroduced in the chemical recovery system as will be subsequently seen.

Certain principles of the invention lend themselves to use in the treatment of soft water supplies which only require the removal of turbidity and coloring factors. Thus to avoid environmental contamination by the disposal of turbidity factors containing coagulants such as alum, magnesium hydroxide is formed in situ in the raw water supply to provide the coagulant for flocculating the turbidity factors. The sludge separated from the treated water, in accord with these aspects of the invention, is carbonated, and, following separation of the respective phases, the magnesium bicarbonate solution is recycled to provide a reactant with lime for producing the coagulant and to reclaim the aqueous component of the sludge. Other coagulants for flocculating the turbidity factors are, of course, avoided. The insolubles which remain from the carbonation step may be treated in accord with other aspects of the invention for the recovery of a reusable lime product enabling the separate disposal of the turbidity factors. Alternatively, the mixture of calcium carbonate and clay may be discarded as a waste product substantially free of environmental pollutants, since both clay and calcium carbonate are natural components of the earth's surface. The treatment of such soft waters will normally elevate the hardness content and makeup magnesium may be added at an appropriate point in the recycling system, as for example as dolomitic quick lime, dolomitic hydrate, hydrated magnesium carbonate, MgO and/or $Mg(OH)_2$.

Raw water supplies vary in analysis throughout the United States as is well known, but in general, the maximum content of magnesium that can be tolerated after softening procedures without causing the formation of undue amounts of encrustations in, for example, household hot water heaters and other apparatuses using the softened waters is about 9 ppm (as ion). As such, there is usually a need for softening municipal raw water supplies which contain greater amounts of magnesium although instances exist where higher magnesium tolerance levels are encountered. Industries, on the other hand, frequently have lower magnesium tolerance levels for their fresh water sources and typical high magnesium containing water supplies that may be treated in accord with the lime process or lime-soda process of softening raw waters and from which the magnesium and calcium values may be recovered as marketable by-products will usually have an analysis which generally falls within the ranges set forth in Table I.

Table I

| | | |
|---|---|---|
| Calcium (as ion) | 15–120 | ppm |
| Magnesium (as ion) | 5–34 | ppm |
| Total Hardness (as $CaCO_3$) | 60–428 | ppm |
| Noncarbonate Hardness (as $CaCO_3$) | 5–174 | ppm |
| Turbidity (Jackson Units) | 0–4800 | |

Some raw water supplies, although having high levels of magnesium, nevertheless have tolerable levels in view of the contemplated use but require the removal of turbidity and coloring matter and/or excess calcium hardness in the raw water supply. Typical raw water supplies that may be treated with lime to produce a magnesium hydroxide coagulant for flocculating turbidity factors or as an incident to the removal of excess calcium hardness factors, while nevertheless maintaining a magnesium level in the treated water comparable to that of the raw water supply, will normally have an analysis which generally falls within the ranges set forth in Table II. As will be subsequently seen, the magnesium values and the aqueous sludge obtained as a consequence of the lime treatment are recovered and recycled to the raw water supply as the magnesium bicarbonate solute in the aqueous phase produced by the sludge carbonation procedures, while the calcium component of the sludge is recovered as a calcined lime product which, except for excess amounts, is similarly recycled for use as the reactant in the water treatment plant.

Table II

| | | |
|---|---|---|
| Calcium (as ion) | 15–62 | ppm |
| Magnesium (as ion) | 5–12 | ppm |
| Total Hardness (as $CaCO_3$) | 60–187 | ppm |
| Noncarbonate Hardness (as $CaCO_3$) | 5–115 | ppm |
| Turbidity (Jackson Units) | 0–1100 | |

Soft raw water supplies having a low magnesium content which may be treated for the removal of turbidity factors without the need for using coagulants ultimately contributing to environmental contamination as a consequence of the disposal of the by-product turbidity factors will normally have an analysis which generally falls within the ranges set forth in Table III.

Table III

| | | |
|---|---|---|
| Calcium (as ion) | 1–29 | ppm |
| Magnesium (as ion) | 0–6 | ppm |
| Total Hardness (as $CaCO_3$) | 5–87 | ppm |
| Noncarbonate Hardness (as $CaCO_3$) | 0–25 | ppm |

Table III-continued

| Turbidity (Jackson Units) | 0-1000 |
| --- | --- |

Figure 2:
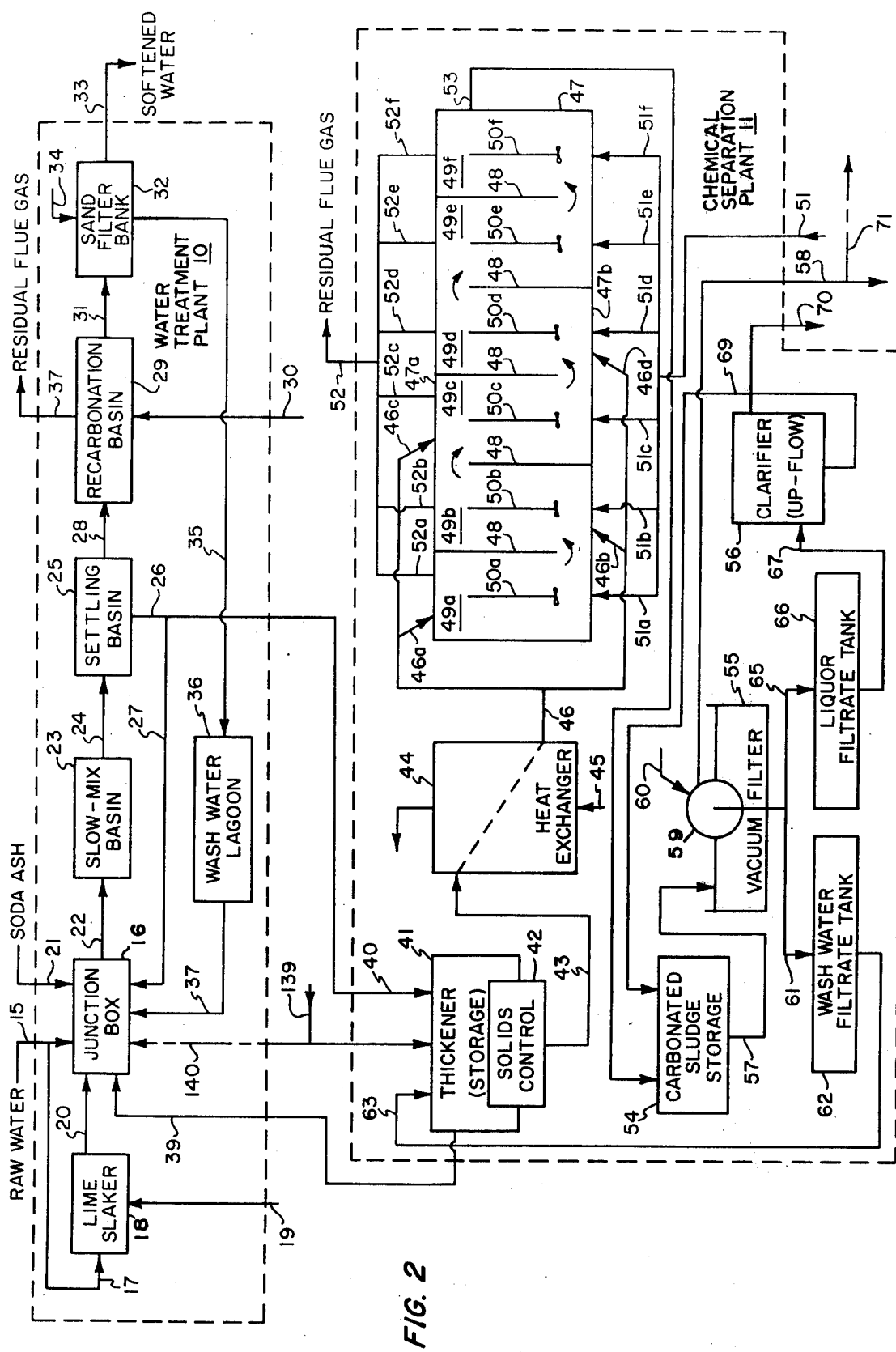
FIG. 2 generally depicts the unit operations and flow of materials in the water treatment and chemical separation plants shown in FIG. 1.
Figure 3:
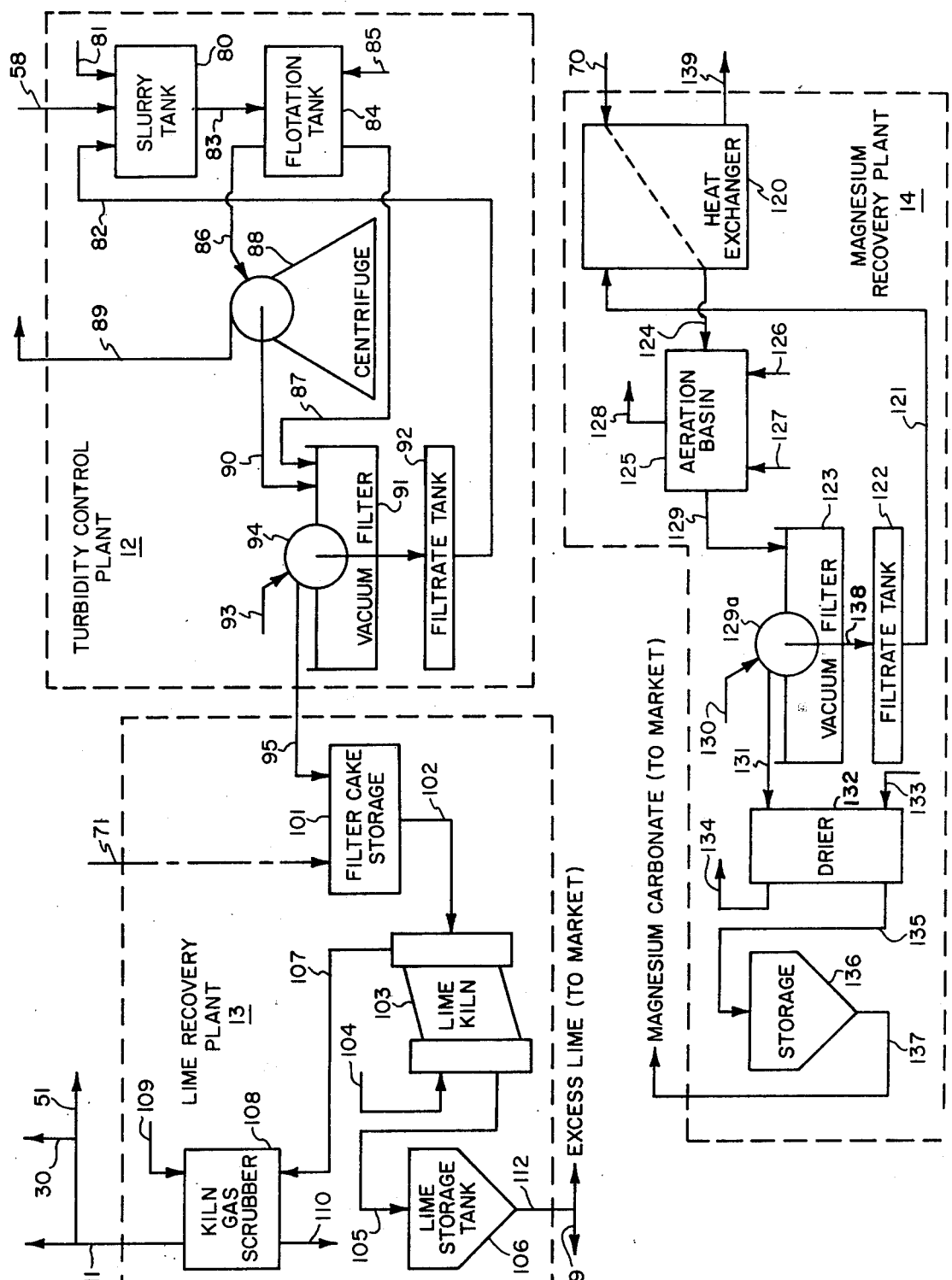
FIG. 3 generally illustrates the unit operations and flow of materials involved in the lime recovery, turbidity control and magnesium recovery plants of FIG. 1 with the modifications heretofore mentioned for accommodating the treatment of nonturbid hard waters and the recovery of a basic magnesium carbonate.

Reference is first made to FIGS. 1 through 3 inclusive and wherein a system for softening a turbid municipal water supply and for thereafter recovering the magnesium and calcium values of the sludge derived from the water treatment plant is generally shown as including the water treatment plant 10, a chemical separation plant 11, a turbidity control plant 12, a lime recovery plant 13, and a magnesium recovery plant 14.

The system depicted contemplates the recovery of by-product magnesium and calcium compounds from the normally waste sludge of a lime-soda process of treating a turbid raw water supply having a high magnesium content level. It will be apparent to those skilled in the art however, that a straight lime process may be utilized if the permanent hardness content of the raw water supply is tolerable for the contemplated use.

Reference is first made to FIG. 1 and wherein raw water 15 is passed to the water treatment plant 10 and is therein treated with soda ash 21 and recycled lime 19 in accord with the lime-soda process of softening hard waters having a high magnesium content.

That portion of the aqueous sludge 40 which is normally disposed of as a waste product of the water treatment process is passed to the chemical separation plant 11. Because the system depicted permits the recovery of lime in the lime recovery plant 13, a portion 30 of the scrubbed flue gases derived from the lime kiln is used for recarbonation of the excess lime in the water treatment plant. The residual flue gases 37 resulting from the recarbonation step that transpires in the water treatment plant are expelled to the atmosphere while the softened water 33 is passed as the fresh water source to the water mains of the municipality.

In the chemical separation plant 11, the sludge is carbonated to solubilize the magnesium values and the insoluble and liquid phase product of the carbonation step are separated so as to facilitate their separate subsequent treatments for the recovery of their chemical values. In plant 11, the solids content of the sludge 40 is normally adjusted for the carbonation treatment, and the residual sludge 39 resulting from the solids adjustment may be recycled to the water treatment plant for use as seed, as will be evident to those skilled in the art. In plant 11, sludge is carbonated by intimate mixture with a portion 51 of the scrubbed flue gases 111 recovered in plant 13 so as to solubilize the magnesium component of the sludge. This permits separation of the magnesium containing aqueous phase and the calcium carbonate containing solids phase, and the residual solids components are passed, in the illustrated embodiment, as a filter cake 58 to the turbidity control plant 12. The clarified aqueous phase 70 which contains the magnesium values as a magnesium bicarbonate solute in the aqueous component of the sludge is, on the other hand, passed to the magnesium recovery plant 14.

In the turbidity control plant 12, the clay and other turbidity factors are separated from the calcium carbonate component of the filter cake 58 by froth flotation procedures, and the separated turbidity factors 89 are disposed of as waste materials, while the purified calcium carbonate is passed as a filter cake 95 to the lime recovery plant 13. Here the calcium carbonate is subjected to conventional calcination procedures to recover a lime product 112 of which a portion 19 is recycled for use as a reactant in the lime-soda process carried out in the water treatment plant.

The clarified liquor 70 from the chemical separation plant 11 will normally be decarbonated in the recovery plant 14 under conditions permitting the recovery of normal magnesium carbonate and its sale to the market, as indicated by line 137. Under such circumstances, the residual liquor 139 derived from the separation of the hydrated insoluble product and the decarbonated liquor is recycled to the chemical separation plant so as to recover the aqueous component of the clarified liquor as well as the residual magnesium values that remain solubilized therein. When the conditions chosen for treating the clarified liquor 70 are such as to recover a marketable basic magnesium carbonate, the residual liquor derived from the separation of the insoluble product from the carbonated liquor will be substantially free of magnesium values, and under such circumstances, as indicated by broken line 140, the residual liquor may be passed directly to the water treatment plant 10 to recover the aqueous component of the clarified liquor 70 and thus also the aqueous component of the treated sludge.

The process as depicted in FIG. 1 contemplates the treatment of raw water containing turbidity factors, and in the absence of such turbidity factors in the raw water supply, the filter cake recovered from the separation plant may be passed directly to the lime recovery plant 13, as indicated by line 71, and thus bypass the processing steps carried out in the turbidity control plant 12.

Reference is now made to FIG. 2 and wherein the various unit operations and flow conditions involved in the water treatment and chemical separation plants are set forth in greater detail.

The water treatment plant depicted in the illustration contemplates the treatment of the entire raw water supply of the municipality in accord with the lime-soda softening process, and the raw water 15 is fed to a junction box 16 with a portion 17 of the supply 15 being shunted to a lime slaker tank 18 for admixture with recycled lime 19 prior to its passage to the junction box 16 as a component of the slaked lime slurry 20. The soda ash 21 used in removing the noncarbonate hardness factors is also fed to the junction box in the illustration, and the effluent 22 from box 16 is passed to a slow mix basin 23. Here sufficient residence time is provided to permit the reactions exemplified by equations (1) through (6) to transpire. The effluent 24 from basin 23 is passed to a settling basin 25 and here the precipitates of magnesium hydroxide and calcium carbonate are permitted to settle out along with the turbidity factors in the rew water. The sludge raw containing the turbidity factors and precipitates in an intimate admixture is separated from the softened water and, as in conventional practice, a portion 27 of the sludge is recycled to the junction box so that the solids content will act as seed for the deposition of the precipitates in the continuous process and thus to minimize the encrustation of the equipment being used in the slow mix and settling basins 23 and 25.

The clarified treated water 28 which results from the separation of sludge 26 is then passed to a recarbonation basin 29. Here the treated water 28 is recarbonated through direct contact with a portion 30 of the scrubbed flue gases derived from the lime recovery plant 13 so as to effect recarbonation of the excess lime used in the water treatment process. The residual flue gases 37, of course, are expelled to the atmosphere and the effluent 31 from basin 29 is then passed to a sand filter bank 32 for the removal of the residual insolubles before the softened waters 33 are passed to the municipal water distribution system. As in conventional practice, the filters of bank 32 are periodically back washed with wash water 34 so as to remove the filtered solids from the sand filters. The back wash 35 and solids removed from the filters are passed in the illustration to a wash water reclamation lagoon 36 for storage purposes and from the lagoon 36 the reclaimed wash water 37 is passed to the junction box so as to recover the wash water within the water treatment plant system.

In conventional lime-soda processing practices, alum is normally added as a coagulant at the junction box so as to act as a flocculating aid in basin 25 to the settling of the insolubles, particularly the clay and other turbidity factors, but, in accord with the invention, the use of alum is avoided when the waters being treated have turbidity factors such as clay because the presence of alum has been found to interfere with conventional froth flotation procedures that will be subsequently described. Hence, the sludge 26 which is removed from the settling basin 25 is substantially free of alum when turbid waters are being treated, and a relatively pure lime product free of such turbidity factors is contemplated as being recovered in the lime recovery plant 13.

In the chemical separation plant 11, the sludge is treated in the illustrated embodiment with scrubbed flue gases derived from the lime kiln so as to carbonate and thereby solubilize the magnesium values of the sludge as a magnesium bicarbonate solute in the aqueous component of the sludge. This permits the magnesium and calcium values to be separated by conventional phase separation techniques involving filtration and clarification and their subsequent recovery in the lime and magnesium recovery plants.

In the embodiment illustrated, that portion 40 of the sludge 26 which is not recycled for seed purposes in the water treatment plant is passed to the chemical separation plant 11 and received in a thickener 41 that serves as a temporary storage for the sludge. Thickener 41 is equipped with an automatic control unit 41 for regulating the solids content and volume flow rate of the sludge effluent 43 which is subjected to carbonation in plant 11. As previously indicated, regulation of the control unit is such as to maintain the magnesium content of the sludge effluent 43 at a value less than 6.5 grams per liter (as MgO) so as to avoid the attainment of supersaturated solutions under the atmospheric pressure conditions involved in the flue gas treatment of the sludge.

Thickener 41 also provides a point in the system which is in advance of the carbonation step and to which process waters containing magnesium values may be recycled for reclamation of the residual magnesium content and recovery of the water values associated with the sludge derived from the water treatment procedures. Thus, recycled wash water 63 and the residual magnesium bicarbonate containing liquor 139 derived from the magnesium recovery plant 14, when the latter plant is operated to produce normal magnesium carbonate, is shown as being recycled to the thickener. In addition to the sludge effluent 43 which is subjected to the carbonation step, thicknener 41 is equipped to provide a recycled sludge effluent 39 for returning excess sludge to the water treatment plant wherein the excess may be used for seed purposes.

The effluent sludge 43 from the automatic solids control unit 42 of thickener 41 is passed in indirect heat exchange with a coolant 45 in heat exchanger 44 so as to reduce the temperature to a point within the range of from 15° to 21° C. The sludge is thereafter maintained in this temperature range throughout the carbonation step and the carbonated products are also maintained in this range until such time as the phase separation transpires. By maintaining the aqueous component of the sludge and the products of the carbonation treatment in this range, spontaneous precipitation of the pentahydrate and trihydrate forms of magnesium carbonate is prevented during the carbonation and phase separation steps.

In practice, the cooled sludge effluent 46 from heat exchanger 44 and which contains an intimate mixture of the calcium carbonate and magnesium hydroxide precipitates is passed to a carbonation unit 47 which is equipped with a plurality of baffles 48 that divide the interior of the unit 47 into a plurality of sludge treatment zones which are interconnected in series for the flow of fluid therethrough and which are designated as 49a through 49f between the feed and discharge ends of the unit. Baffles 48 are arranged to provide a tortous flow path for the sludge through the unit, as is indicated by the arrows in FIG. 2. Although other baffle arrangements may be used to provide the series connected zonal arrangement, the baffles 48 are alternately offset from the top 47a and bottom 47b of the unit so that the sludge discharges from the zone alternate between points at the bottom 47b of the unit and the top 47a of the unit as the aqueous sludge passes successively through the zones.

Each zone in the unit 47 is provided with a mechanical agitator that is used to intimately disperse flue gases introduced into the zone and the agitators are designated at 50a through 50f inclusive. In practice, it is important that the sludge in each zone be maintained substantially saturated with respect to carbon dioxide so as to prevent buildup of the product of reaction (7) and the spontaneous precipitation of a hydrated form of magnesium carbonate. Hence, the flue gases 51 used for the carbonation reaction are divided and introduced at the bottom of each zone, as is indicated by arrows 51a through 51f inclusive. The point of gas introduction is, of course, below the agitator in each zone and the agitator serves to intimately disperse the flue gases throughout the flowing sludge in the zone. The residual flue gases at the top of each zone, as indicated by lines 52a through 52f inclusive, are expelled to the atmosphere without further contact with the sludge, and it is important that an excess amount of flue gas be introduced to each zone so that the residual flue gases emanating from each zone have a residual carbon dioxide content, in order to avoid stripping any dissolved $CO_2$ from the sludge in the zone.

In operating the carbonation unit 47, it is important to avoid reaction (9) by avoiding the addition of an amount of magnesium hydroxide to the reaction zones that exceeds its consumption by reaction (7). As such, the cooled sludge 46 is divided in carrying the carbonation step into practice and progressively diminishing portions of the sludge are introduced in successive zones along the flow path of the sludge through the unit. This division and introduction of the sludge portion at the feed end of each zone is indicated by arrows 46a through 46d inclusive and wherein the volume of sludge introduced into each zone progressively diminishes along the flow path from zone 49a to 49d. It will be apparent to those skilled in the art that the concentration of soluble magnesium in each zone progressively increases from the first zone 49a to the last zone 49f. In the arrangement depicted, the introduction of sludge to the last two zones, 49e and 49f, is avoided in practice so as to provide sufficient residence time to permit reactions (7) and (8) to go to completion without increasing the driving force for reaction (9).

As previously indicated, the sludge subjected to carbonation, should have a magnesium content which is less than 6.5 grams per liter (as MgO) to avoid the formation of a supersaturated solution. In practicing the carbonation step, the carbonated sludge, effluent 53 from unit 47 will have a soluble magnesium content from about 6.0 to about 6.5 grams per liter (as MgO) when the scrubbed flue gases contain about 18 to 20% $CO_2$.

The reactions which transpire in unit 47, of course, solubilize the magnesium hydroxide in the aqueous component of the cooled sludge and the carbonated sludge 53 containing the insoluble calcium carbonate and turbidity factors is then passed, in the normal operation of the embodiment depicted, to a sludge storage tank 54. The insolubles in the carbonated sludge are removed from the carbonated liquor that results from the carbonation step conducted in unit 47 in a vacuum filter 53 and in an upflow clarifier 56. To effect this separation, the carbonated sludge 57 derived from tank 54 is passed to the filter 55, and the insoluble components of the sludge are removed from the filter 55 as a filter cake 58. On the drum 59 of filter 55, the cake, prior to its withdrawal, is washed with wash water 60 and by means of a split filtrate tank system, the wash water filtrate 61 is recovered in a wash water filtrate tank designated at 62. This wash water filtrate contains residual liquor containing solubilized magnesium values, and hence, the magnesium bicarbonate containing wash water recovered in tank 62 is passed, as indicated by arrows 63, to thickener 41 so as to permit recovery of the magnesium values removed by the washing operation.

The magnesium bicarbonate containing liquor 65 of sludge 57 is recovered from the filtration operation in a liquor filtrate tank 66 and the effluent 67 from this tank 66 is passed to an upflow solids contact reactor-clarifier 56 in the illustrated embodiment to therein separate and recover residual insolubles that have passed through the filtration system. The solids which settle out in clarifier 56 are separated as a sludge 69 that is recycled to the carbonated sludge storage tank 54 while the overflow or supernatant liquor 70 which contains the solubilized magnesium values is passed to the magnesium recovery plant 14.

The embodiment of the invention illustrated in FIGS. 1 through 3 contemplates the treatment of a turbid municipal raw water supply, and the clay and other components which make up the turbidity factors are separated from the calcium carbonate component of the filter cake 58 in plant 12. In this plant 12, the flocculant-free filter-cake containing the calcium carbonate and turbidity components is intimately mixed in a slurry tank 80 with a suitable flotation agent 81 and recycled filtrate 82 to provide a slurry 83 which is then fed to the flotation unit 84. Flotation unit 84 in the embodiment illustrated is designed to separate the turbidity factors as a float 86 and among flotation agents which may be employed for such purposes are the tall oils and organic amines, such as the fatty acid amines exemplified by dodecyl amine. Such flotation agents are used in varying amounts well known in the art. The calcium carbonate and turbidity factors as fed to the flotation unit 84 are dispersed throughout the aqueous component of the slurry 83. The slurry in unit 84 is mixed in the illustrated embodiment with air 85 by conventional procedures so that the float 86 containing the turbidity factors is recovered at the top of the unit while the calcium carbonate component of the dispersion settles out and is removed as a calcium carbonate containing sludge 87. Other means for physically separating the turbidity factors and calcium carbonate may be employed, as will be apparent to those skilled in the art.

Although other dewatering procedures may be used, in the embodiment illustrated, the float 86 is passed to a centrifuge 88 from which the turbidity factors are separated from the aqueous component and removed as a highly concentrated sludge 89 that is disposed of as waste material. The residual liquor 90 from the dewatering operation, on the other hand, is passed to a vacuum filter 91 where it is combined with the slurry 87 which is recovered as the underflow from unit 84. In vacuum filter 91 the insoluble calcium carbonate containing slurry is subjected to filtration so that the insoluble calcium carbonate component is separated from the aqueous component and recovered as a filter cake 95. The filtrate from the filtration operation, on the other hand, is recovered in filtrate tank 92 of filter 91 along with the wash water 93 which is used to provide a final wash to the filter cake on drum 94 before passage of the cake 95 to the lime recovery plant.

It is important to note, insofar as the operation of the turbidity control plant 12 is concerned, that the feed product 58 to plant 12 and which contains the calcium carbonate and turbid components, must be substantially free of alum and other coagulants in order to accomplish a separation of the insolubles by flotation procedures. Hence, the use of coagulants in the water treatment plant 10 and which survive the carbonation step to accompany the residual insolubles is precluded when the need arises to operate a turbidity control plant in conjunction with the overall chemical recovery system.

In the lime recovery plant 13, the filter cake 95 is initially stored in the filter cake storage tank 101 and from which it is conveyed, as indicated by line 102, to the lime kiln 103. In kiln 103, the cake is calcined by a conventional procedure utilizing a suitable fuel-air mixture 104, and the lime product 105 of the calcination step is recovered in the illustration and then passed to a lime storage tank 106, while the flue gases 107 from kiln 103 are passed to a scrubbing unit 108. These gases are then cooled and scrubbed by direct contact with scrub water 109 which is introduced at the top of the scrubber and subsequently removed from the bottom, as indicated by line 110. The scrubbed flue gases are removed from scrubber 108, as indicated by line 111, and respective portions 51 and 30 are used for carbonation purposes in the chemical separation and water treatment plants 11 and 10 respectively.

The lime product of the calcination reaction is removed from storage tank 106 as indicated by line 112, and a portion, in the illustrated embodiment, is recycled as recycled lime 19 for use as a recycled reactant in the water treatment plant 10 while the balance in the illustration is sold in the market place.

The lime product recovered in plant 13 is a high quality product which with good plant practices will be characterized by an MgO content of less than 1% and a total insoluble content of less than 4.0%.

Although the illustration is based upon the treatment of a turbid municipal raw water supply, certain aspects of the invention contemplate the treatment of raw water supplies that are free of turbidity factors and under such circumstances, the need for a control plant 12 will be unnecessary so that the filter cake 58 may be directly passed to the lime recovery plant 13, as indicated by line 71.

In the illustrated embodiment, the soluble magnesium values of the liquid phase component of the carbonated sludge are recovered as a normal hydrate of magnesium carbonate, and hence the clarified liquor 70 from the separation plant 11 is decarbonated by first heating the liquor to a temperature in the range of from 35° to 45° C. This is accomplished in part by passing the cool clarified liquor 70 through a heat exchanger 120 and in indirect heat exchange with hot filtrate 121 which is derived from the vacuum filter 123 in plant 14 so as to recover the heat content of the filtrate. The heated liquor 124 derived from exchanger 120 is then passed to an aeration basin 125 while live steam 126 is admitted to raise the temperature to the range indicated. Air 127 is also passed into the basin 125 so as to accomplish the stripping action and act as a vehicle for removing the carbon dioxide content during the decarbonation step. The residual gases 128 are removed as an effluent from basin 125 and during the stripping action that transpires during the decarbonation step, magnesium carbonate precipitates as the trihydrate, and the slurry 129 resulting from the decarbonation step is passed to a vacuum filter 123.

In filter 123 the normal magnesium carbonate precipitate is picked up on drum 129a and is washed with wash water 130 and removed as a washed filter cake 131 which is passed to a suitable drier 132. The filtrate 138 from filter 123 is recovered in the filtrate tank 122 and recycled to the heat exchanger as indicated previously and shown by line 121.

In the drier 132 chemically unbound residual water is removed by direct contact with hot gases 133 that are admitted to the drier and from which the residual gases are removed as indicated by line 134. The dried product 135 is then stored in a suitable storage tank 136 until distributed to the market, as indicated by line 137.

The liquor 138 derived from the phase separation step which is accomplished in filter 123 normally has a magnesium content of about 1 gram per liter (as MgO), and following the transfer of the heat content to clarified liquor 70 in heat exchanger 120, the cooled residual liquor 139 is recycled to thickener 41 in the chemical separation plant 11, so that the residual magnesium values as well as the aqueous component can be recovered in the chemical recovery system. The aqueous component of the separated sludge which is treated is accordingly recovered in the chemical recovery system and ultimately returned to the water treatment plant with the residual sludge 39.

The recovery of the magnesium values as a basic magnesium carbonate is also contemplated, and under such circumstances, the operation of the magnesium recovery plant may be modified to maintain a temperature in the aeration basin 125 in excess of 50° C and preferably at the boiling point of the slurry therein. Under such circumstances, the use of air for stripping the $CO_2$ content from the slurry is optional and the magnesium carbonate crystallizes as the basic form of magnesium carbonate and is separated from the residual liquor in the filter and subsequently dried and stored as will be apparent to those skilled in the art. When the basic magnesium carbonate is recovered however, the residual liquor recovered from the decarbonation step will usually contain less than 0.1 grams per liter magnesium (as MgO), and under such circumstances the cooled residual liquor 139 may be directly passed to the water treatment plant to account for recovery of the aqueous component of the sludge treated as is indicated by broken line 140.

EXAMPLE

As a typical example of the operation of the chemical separation plant, a normally waste sludge having 5% solids content and the sludge solids analysis depicted in Table IV may be concentrated in the thickener to adjust the solids content to about 7.8% solids and fed at the rate of 300 gallons per minute to a heat exchanger and cooled to about 16° C. The effluent from the heat exchanger may then be passed to a carbonation unit, such as depicted at 47 in FIG. 2, and which is designed to maintain a residence time of 20 minutes in each of the zones when the sludge is fed to the zones at the rate indicated in Table V. By intimately dispersing flue gases fed to each zone by mechanical agitation, so that the sludge in each zone is always saturated with carbon dioxide, the effluent from each zone may have an analysis indicated in Table V and wherein the effluent from zone 49f will have a magnesium content of about 6.4 grams per liter (as MgO). Separation of the insoluble matter in the carbonated product will produce about 15,000 pounds per hour ($CaCO_3$-dry) of a filter cake from which the impurities may be separated by conventional froth flotation to recover approximately 9,000 pounds of lime (as CaO) per hour which has the following analysis:

| | |
|---|---|
| $SiO_2$ | 2.5% |
| $Al_2O_3 + Fe_2O_3$ | 1.1% |
| CaO | 96.1% |
| MgO | 0.3% |
| | 100.0% |

The residual carbonated liquor derived from separation of the filter cake may then be heated to 40° C. and while maintained in the temperature range of between 35° and 45° C. aerated for about 90 minutes to strip the $CO_2$ content and recover about 3,300 pounds per hour of the normal magnesium carbonate ($MgCO_3 \cdot 3H_2O$). In lieu of recovering the magnesium carbonate as a normal hydrate, the aeration step may be carried out by boiling the liquor to recover about 2,800 pounds per hour of the magnesium as the basic magnesium carbonate.

Table IV

| | Sludge Solids (Dry Basic) |
|---|---|
| Component | Weight% |
| $CaCO_3$ | 84.6 |
| $Mg(OH)_2$ | 11.5 |
| $SiO_2$ | 0.6 |

Table IV-continued

| Component | Sludge Solids (Dry Basic) Weight% |
|---|---|
| Insolubles | 3.3 |

Table V

| Zone | 49a | 49b | 49c | 49d | 49e | 49f |
|---|---|---|---|---|---|---|
| Sludge Feed (gpm) | 150 | 75 | 45 | 30 | 0 | 0 |
| Residence Time (min) | 20 | 20 | 20 | 20 | 20 | 20 |
| Effluent Analysis (ppm) (as $CaCO_3$) | | | | | | |
| $Mg(OH)_2$ | 2000 | 2000 | 1140 | 1000 | 500 | — |
| $MgCO_3$ | 5000 | 6000 | 6000 | 4000 | 2000 | 1000 |
| $Mg(HCO_3)_2$ | 1000 | 4000 | 7000 | 11000 | 13500 | 15000 |
| MgO Solubility | 6000 | 10000 | 13000 | 15000 | 15500 | 16000 |

Figure 4:
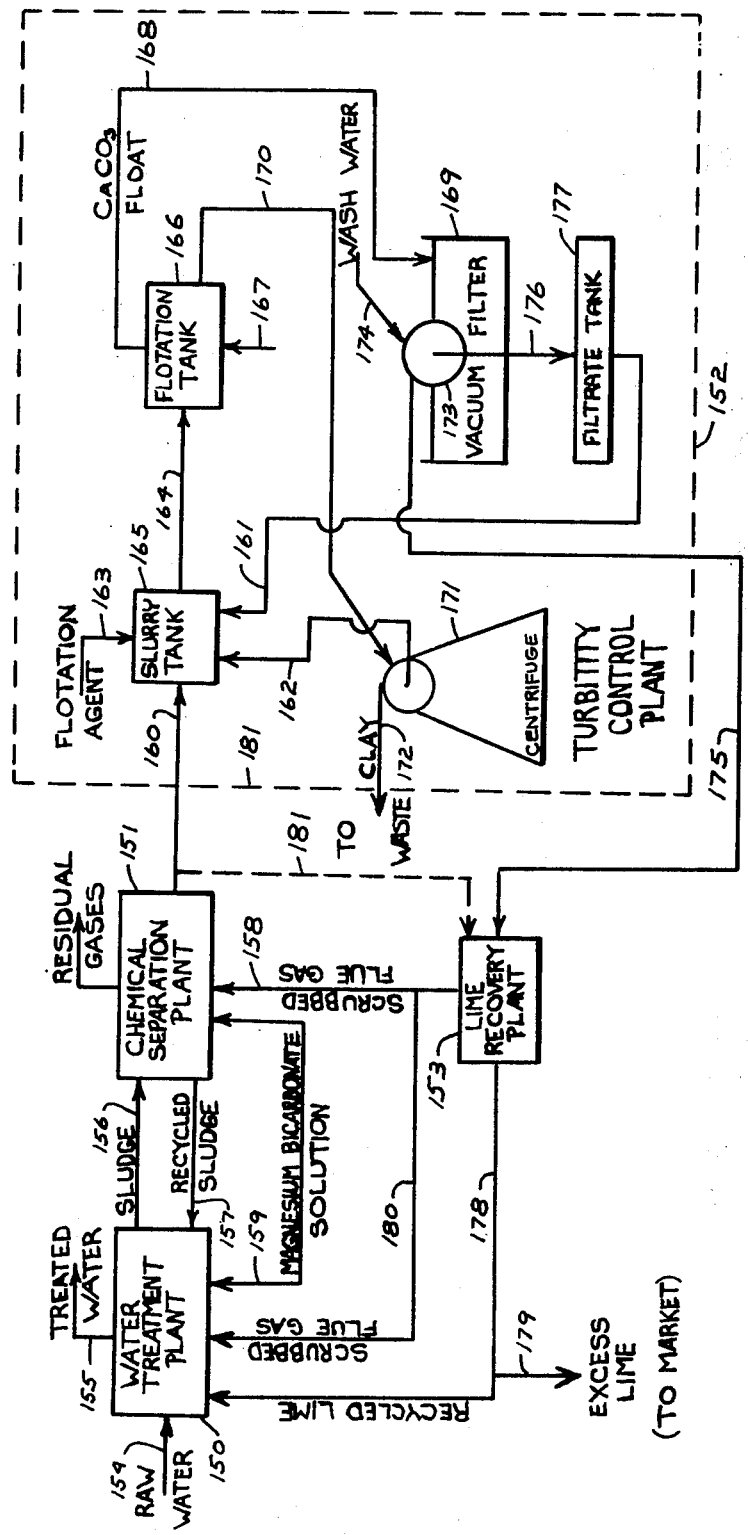
FIG. 4 diagrammatically illustrates the flow of materials between the plant components of a system for treating a turbid raw water supply having a tolerable magnesium content level in accord with a lime process of removing carbonate hardness factors and for recovering the chemical and aqueous components of the normally waste sludge apart from the turbidity factors of the supply, the illustration generally depicting the unit operations and flow of materials in the turbidity control plant and further illustrating an optional procedure available when the raw water supply is free of turbid and water coloring components.

Reference is now made to the embodiment of the invention diagrammatically illustrated in FIG. 4 to depict the treatment of a turbid raw water supply having a high, yet tolerable, magnesium content. This system includes a water treatment plant 150, a chemical separation plant 151, a turbidity control plant 152, and a lime recovery plant 153.

The raw water supply 154, in this instance, is treated with lime and magnesium bicarbonate reactants which form a magnesium hydroxide coagulant that serves to flocculate the turbide components of the supply 154. The calcium carbonate and flocculated turbidity factors are separated from the treated water 155 as solids components of an aqueous sludge 156 as in conventional lime softening procedures, and sludge 156 is passed to the chemical separation plant 151 for carbonation and separation of the liquid and solids products of the carbonation step.

The treatment accorded the sludge 156 in plant 151 is like that in the prior embodiment, and excess sludge resulting from the solids adjustment is returned as recycled sludge 157 for use as a seed in the water treatment plant 150. As in the prior embodiment, scrubbed flue gas 158 derived from the lime recovery plant 153 is used in the carbonation step, and the liquid phase magnesium bicarbonate solution 159 resulting from the separation step is recovered and recycled to the water treatment plant to serve as a reactant with lime for formation of the coagulant.

The residual solubles comprising the calcium carbonate and separated turbidity factors are passed in the illustration as a filter cake 160 to the turbidity control plant 152. In plant 152 the filter cake 160 is slurried with recycled filtrate 161 and residual water 162 derived from the centrifical de-watering of the turbidity factors. A suitable flotation agent 163 is also mixed with the slurry. The flotation step may be designed to float either the turbidity or calcium carbonate components and in the use in the illustration is designed to float the latter from the former and among suitable flotation agents which may be used in this instance are the fatty acids, such as Arizona Chemical, FA-1, the tall oil soaps, such as Hercules D Resonate (TX-60W). In some cases the addition of soda ash or sodium silicate as regulators has been found beneficial as will be apparent to those skilled in the art.

The slurry 164 from tank 165 is passed to the flotation unit 166, to which air 167 is added to provide an aqueous float 168 that is then passed to a vacuum filter 169. The underflow 170 from the flotation tank 166 contains the clay and other turbidity producing components and is passed to a centrifuge 171 for dewatering. The concentrated slurry 172 containing the clay is then disposed of as waste material while the recovered water 162 is, as previously indicated, recycled to the slurry tank 165.

In filter 169 the insoluble calcium carbonate is picked up on drum 173, washed with a suitable wash water 174 and passed as a filter cake 175 to the lime recovery plant 153. The filtrate 176 on the other hand is recovered in filtrate tank 177 and recycled as previously indicated to the slurry tank 165.

In the lime recovery plant 153 the filter cake 175 is calcined as in conventional practice, and the lime product 178 is recovered and recycled to the water treatment plant 150 to serve as a reactant for the in situ formation of the coagulant, with any excess lime product 179 being available for market purposes. The flue gases recovered from the lime kiln in plant 153 are, of course, scrubbed with water and a portion 158 used for carbonation purposes in plant 151, while another portion 180 is recycled to the water treatment plant for carbonation purposes.

In the system illustrated in FIG. 4, the magnesium bicarbonate solution recovered from the sludge is recycled to the water treatment plant with the net results that the treated water has substantially the same level of magnesium as that of the raw water supply. The procedures advocated in FIG. 4 of course permit the recovery of any excess water lime over that required to produce the desired amount of coagulant and as in the prior embodiment, the use of other coagulants which would survive the carbonation step in plant 151 are avoided so as to permit the physical separation of the turbid and calcium carbonate components of the residual solids obtained from plant 151.

In those instances where the raw water supply is nonturbid and there is sufficient excess of calcium hardness in the raw water supply to warrant recovery of the lime product, the filter cake recovered from plant 151 may be fed directly to the lime recovery plant 153 as indicated by line 181 although the procedures advocated in this embodiment will be found to have greatest utility in the treatment of turbid raw water supplies having a tolerable magnesium hardness level and where it is desired to avoid disposal of a waste product containing environmentally polluting coagulants such as alum.

Figure 5:
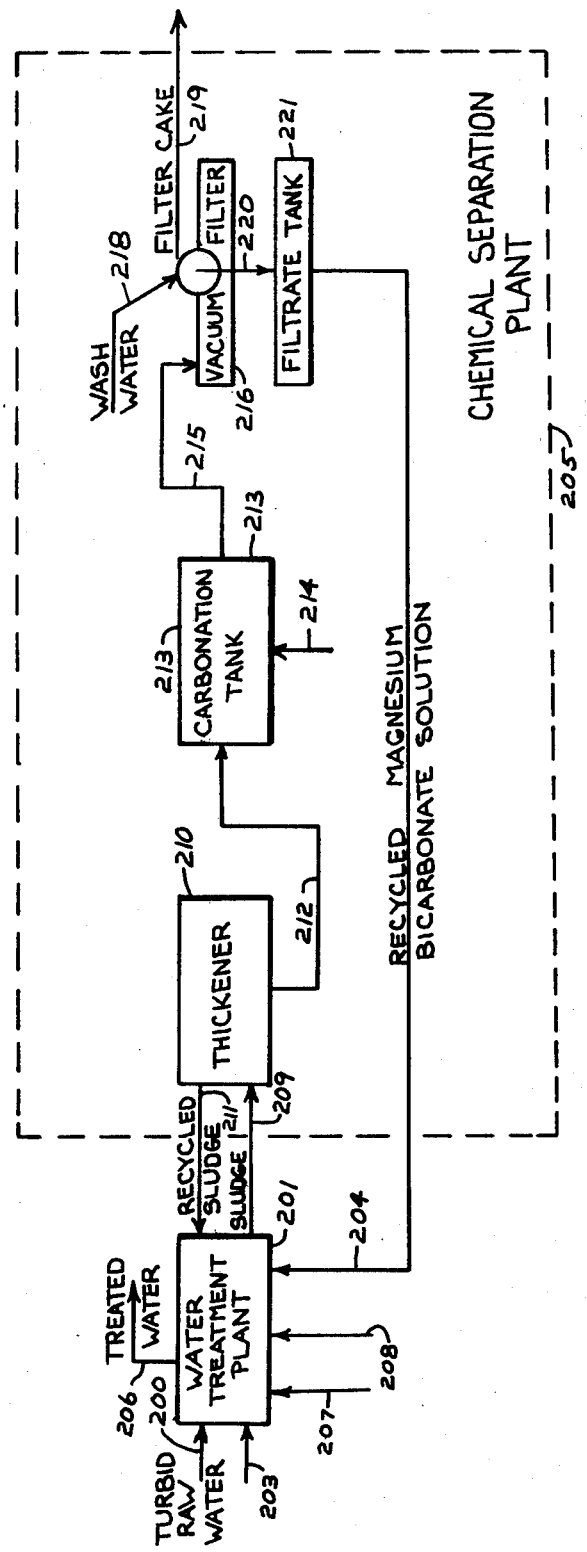
FIG. 5 diagrammatically illustrates the flow of materials between the plant components of a system for treating a turbid raw water supply having a low magnesium content level in accord with certain aspects of the invention and for recovering a magnesium bicarbonate solution from the sludge by-product of the water treatment plant operation, the illustration depicting the various unit operations and flow of materials in the chemical separation plant of the depicted system.

Reference is now made to FIG. 5 and wherein certain principles of the invention are used in the treatment of a turbid soft water supply so as to avoid the disposal of waste by-products containing alum or other coagulants. In this instance the turbidity factors are flocculated and settled in the treatment plant 201 by the in situ formation of magnesium hydroxide in the raw water supply 200. The reactants in this case include lime 203 from a suitable source and the magnesium bicarbonate solute of the recycled solution 204 recovered in the chemical separation plant 205. The treated water 206 in this case will normally have a higher hardness content than that of the supply as a consequence of the treatment, and hence, makeup magnesium reactant for the formation of the coagulant may be supplied in the form of normal magnesium carbonate 207. In this illustration the sludge is only treated for the recovery of the magnesium values, and hence, recarbonation in plant 201 is accomplished through the use of $CO_2$ 208 from any suitable source. The sludge 209 which is separated from the treated water 206 in plant 201 is passed to a thickener 210 in the illustrated embodiment and the overflow 211 is recycled to the water treatment plant where residual solids components serve as seed in the conventional manner. The underflow 212 is then passed to a carbonation tank 213 in the illustrated embodiment and carbonated through the addition of carbon dioxide 214 from a suitable source. This, of course, solubilizes the coagulant as a magnesium bicarbonate solute in the aqueous component of the sludge, and the effluent 215 from the carbonation tank is passed to a vacuum filter 216 in the illustrated embodiment. The embodiment illustrated contemplates the simple carbonation of the sludge under circumstances where some losses of magnesium as insoluble products will result and of course the close controls advocated in the discussion of FIG. 2 may be utilized to avoid contaminating the insolubles recovered from the carbonation treatment with magnesium values if such is desirable.

In filter 216 the insolubles are picked up on drum 217, subjected to a wash with water 218 and recovered as a filter cake 219 containing residual calcium carbonate and turbidity factors. This produce can be disposed of as a substantially non-contaminating land fill or alternatively, when the plant size warrants its recovery, subjected to flotation procedures heretofore advocated so as to enable recovery of a lime product. The filtrate 220 is recovered in filtrate tank 211, and the magnesium bicarbonate solution 204 is then recycled to the water treatment plant to recover the aqueous component of the sludge and provide a reactant for formation of the coagulant.

Dolomitic quick lime or dolomitic hydrate may be used to provide makeup magnesium and under such circumstances would be added at the water treatment plant to provide a source of lime, the magnesium content under such circumstances would be recovered with the sludge and upon carbonation would be transformed to magnesium bicarbonate for recycle purposes. In lieu of the dolomitic materials, pure forms of MgO and $Mg(OH)_2$ may be employed as makeup and, under such circumstances, these materials would preferably be added to the underflow 212 of thickener 210.

While only certain preferred embodiments of this invention have been shown and described by way of illustration, many modification will occur to those skilled in the art and it is, therefore, desired that it be understood that it is intended herein to cover all such modifications as fall within the true spirit and scope of the invention.

What is claimed as new and what it is desired to secure by Letters Patent of the United States is:

1. The method of recovering calcium values from an aqueous sludge product of the lime treatment of raw water and which is separated from the treated water and contains an aqueous component and an intimate mixture of precipitated calcium carbonate and precipitated magnesium hydroxide, said method comprising the steps of:

A. carbonating the separated aqueous sludge product to solubilize the precipitated magnesium hydroxide of the separated sludge product in the aqueous component of the separated sludge product, thereby to provide a carbonated sludge product which has a liquid phase component that contains the solubilized magnesium hydroxide and which has residual solids that include the precipitated calcium carbonate, B. separating the residual solids from the liquid phase component of the carbonated sludge product, and C. calcining the precipitated calcium carbonate of the separated residual solids obtained from the separating step (B) and recovering the calcium values of the separated aqueous sludge product as a calcined lime product;

said carbonating step comprising steps of:

A-1. maintaining a flow path of the separated aqueous sludge product through a plurality of serially connected sludge treatment zones by continuously introducing progressively diminishing portions of the separated aqueous sludge product to successive treatment zones along the path of the maintained flow, A-2. continuously introducing scrubbed flue gases at the bottoms of each of the respective zones, A-3. continuously and intimately mixing the flue gases introduced in the respective treatment zones with the flowing aqueous sludge therein, A-4. continuously withdrawing the introduced gases remaining from the intimate mixture thereof with the flowing aqueous sludge from the tops of each of the respective zones, and A-5. continuously withdrawing the carbonated sludge product from the last of the treatment zones along the maintained flow path;

said separated aqueous sludge product being maintained between 15° C. and 21° C. during its flow through the sludge treatment zones, said carbonated sludge product being maintained between 15° C. and 21° C. during the separation step (B), said flowing aqueous sludge being maintained under substantially atmospheric pressure conditions during its flow through the treatment zones, and said portions of the separated aqueous sludge product introduced to the treatment zones having a magnesium content less than 6.5 grams per liter (as MgO).

2. The method in accord with claim 1 wherein the calcining step (C) is performed in a lime kiln, and wherein flue gases recovered from the lime kiln are scrubbed with water and thereafter used as the scrubbed flue gases in the introducing step (A-2).

3. The method of treating turbid raw water to remove the turbidity factors therefrom and of recovering calcium values of an aqueous sludge product of the treatment accorded the turbid raw water comprising the steps of:

A. treating the turbid raw water with at least sufficient lime to form an intimate mixture of precipitated calcium carbonate and precipitated magnesium hydroxide in the raw water, said magnesium hydroxide flocculating the turbidity factors, B. settling the mixture of the precipitates and turbidity factors in the lime treated water and in the absence of coagulants other than the precipitated magnesium hydroxide, thereby to form said aqueous sludge product and provide solids components in the aqueous sludge product that include the calcium carbonate and magnesium hydroxide precipitates and the turbidity factors, C. separating the formed aqueous sludge product from the lime treated water, D. carbonating the separated aqueous sludge product to solubilize the precipitated magnesium hydroxide of the separated sludge product in the aqueous component of the separated sludge product, thereby to provide a carbonated sludge product with a liquid phase component that contains the solubilized magnesium hydroxide and with residual solids that include the turbidity factors and the precipitated calcium carbonate, E. separating the liquid phase component of the carbonated sludge product from the residual solids of the carbonated sludge product, F. mixing the separated residual solids with water to form an aqueous slurry, G. passing the formed aqueous slurry through a flotation unit to separate the turbidity factors of the formed aqueous slurry from the precipitated calcium carbonate of the formed aqueous slurry and disposing of the separated turbidity factors as a waste material, and H. calcining the separated precipitated calcium carbonate in a lime kiln, and recovering the calcium values of the separated alum-free aqueous product as a calcined lime product.

4. The method in accord with claim 3 wherein the calcining step (H) is performed in a lime kiln, wherein the separated aqueous sludge product is carbonated in the carbonating step (D) by treatment with flue gases recovered from the lime kiln, and wherein the recovered flue gases recovered from the lime kiln are scrubbed with water prior to their use in treating the aqueous sludge product in the carbonation step (D).

5. The method of treating a turbid raw water to remove the turbidity factors therefrom and of recovering the water component, magnesium values and calcium values of an aqueous sludge product of the treatment accorded the turbid raw water comprising the steps of:

A. treating the turbid raw water with sufficient lime and a magnesium hydroxide forming reactant therewith to form an intimate mixture of precipitated calcium carbonate and precipitated magnesium hydroxide in the in the raw water, said magnesium hydroxide flocculating the turbidity factors, B. settling the precipitates and the flocculated turbidity factors in the lime treated water and in the absence of coagulants other than the precipitated magnesium hydroxide, thereby to form said aqueous sludge product and provide solids components in the aqueous product that include the calcium carbonate and magnesium hydroxide precipitates and the turbidity factors, C. separating the formed aqueous sludge product from the lime treated water, D. carbonating the separated aqueous sludge product to solubilize the precipitated magnesium hydroxide of the separated sludge product in the aqueous component of the separated sludge product, thereby to provide a carbonated sludge product with a liquid phase component that contains the solubilized magnesium values and with residual solids that include the turbidity factors and the precipitated calcium carbonate, E. separating the liquid phase component of the carbonated sludge product from the residual solids of the carbonated sludge product, F. mixing the separated liquid phase component with the turbid raw water in the treating step (A) to provide at least a portion of the magnesium hydroxide forming reactant with the lime used in treating the turbid raw water in the treating step (A), thereby recovering the water component and magnesium values from the aqueous sludge product formed in the settling step (B), G. separating the included turbidity factors from the included precipitated calcium carbonate of the separated residual solids obtained from the separating step (E) and disposing of the separating turbidity factors as a waste material, H. calcining the separated precipitated calcium carbonate obtained from step (G), and recovering the calcium values from the aqueous sludge product formed in step (B) as a calcined lime product, and I. mixing calcined lime product obtained from the calcining step (H) with the turbid raw water in the treating step (A) to provide lime for treating the turbid raw water and a reactant with the solubilized magnesium values of the separated liquid phase component that is mixed with the turbid raw water in the mixing step (F).

6. The method in accord with claim 5 wherein the carbonating step (D) comprises the steps of:

D-1. maintaining a flow path of the separated aqueous sludge product through a plurality of serially connected sludge treatment zones by continuously introducing progressively diminishing portions of the separated aqueous sludge product to successive treatment zones along the path of the maintained flow, D-2. continuously introducing flue gases at the bottoms of each of the respective zones, D-3. continuously and intimately mixing the flue gases introduced in the respective treatment zones with the flowing aqueous sludge therein, D-4. continuously withdrawing the introduced gases remaining from the intimate mixture thereof with the flowing aqueous sludge from the tops of each of the respective zones, and D-5. continuously withdrawing the carbonated sludge product from the last of the treatment zones along the maintained flow path;

wherein the sludge treatment zones are maintained at substantially atmospheric pressure conditions;

wherein the separated aqueous sludge product introduced to the sludge treatment zones has a magnesium content less than 6.5 grams per liter (as MgO);

wherein the separated aqueous sludge product is maintained between 15° and 21° C. during its flow through the sludge treatment zones; and wherein the carbonated sludge product is maintained between 15° and 21° C during the separating step (E).

7. The method in accord with claim 6 comprising the further step of:

I. mixing the calcined lime product obtained from the calcining step (H) with the turbid water in the treating step (A) to provide lime for treating the turbid raw water and a reactant with the solubilized magnesium values of the separated liquid phase component that is mixed with the turbid raw water in the mixing step (F).

8. The method in accord with claim 5 wherein the calcining step (H) is performed in the lime kiln, wherein flue gases recovered from the lime kiln are scrubbed with water, and wherein the carbonating step (D) comprises intimately mixing the scrubbed flue gases with the separated aqueous sludge product to solubilize the precipitated magnesium values of the separated sludge product in the aqueous component of the separated sludge product.

9. In a system for softening a water supply to remove soluble calcium and magnesium values therefrom and wherein the supply is treated with sufficient lime to form calcium carbonate and magnesium hydroxide precipitates that are separated from the treated water supply as an aqueous sludge product having solids components that include the precipitated calcium carbonate and precipitated magnesium hydroxide, the method of treating the separated aqueous sludge product to recover the water component, magnesium values and calcium values of the separated aqueous sludge product comprising the steps of:
   A. carbonating the separated aqueous sludge product to solubilize the precipitated magnesium values of the separated sludge product in the aqueous component of the separated sludge product, thereby to provide a carbonated sludge product with residual solids that include the precipitated calcium carbonate with a liquid phase component that contains the solubilized magnesium values,
   B. separating the residual solids of the carbonated sludge product from the liquid phase component of the carbonated sludge product,
   C. decarbonating the separated liquid phase component to provide an aqueous slurry containing a hydrated form of a precipitated magnesium carbonate and residual liquid that remains from the decarbonation of the separated liquid phase component,
   D. separating the hydrated form of precipitated magnesium carbonate of the aqueous slurry from said residual liquid and recovering the magnesium values of the separated aqueous sludge product as a hydrated magnesium carbonate product,
   E. calcining the precipitated calcium carbonate component of the separated residual solids, and recovering the calcium values of the separated aqueous sludge product as a calcined lime product.

10. The method in accord with claim 9 wherein the decarbonating step (C) comprises steps of:
   C-1. heating the separated liquid phase component to a temperature in the range of from 35° to 45° C., and
   C-2. passing air through the heated separated liquid phase component to precipitate normal magnesium carbonate and thereby provide said aqueous slurry; and additionally comprising the step of:
   F. mixing the separated residual liquid with the separated aqueous sludge product before the carbonation of the separated aqueous sludge product in accord with step (A).

11. The method in accord with claim 9 wherein the decarbonating step (C) comprises the step of:
   C-1. heating the separated liquid phase component to a temperature in excess of 50° C. to precipitate basic magnesium carbonate and thereby provide said aqueous slurry, and additionally comprising the step of:
   F. mixing the separated residual liquid with the water supply.

12. The method in accord with claim 9 wherein the carbonating step (A) comprises the steps of:
   A-1. maintaining a flow path of the separated sludge product through a plurality of serially connected sludge treatment zones by continuously introducing progressively diminishing portions of the separated aqueous sludge product to successive treatment zones along the path of the maintained flow,
   A-2. continuously introducing flue gases at the bottoms of each of the respective zones,
   A-3. continuously and intimately mixing the flue gases introduced in the respective treatment zones with the flowing aqueous sludge therein,
   A-4. continuously withdrawing the introduced gases remaining from the intimate mixture thereof with the flowing aqueous sludge from the tops of each of the respective zones and
   A-5. continuously withdrawing the carbonated sludge product from the last of the treatment zones along the maintained flow path;
   wherein the sludge treatment zones are maintained under substantially atmospheric pressure conditions;
   wherein the separated aqueous sludge product introduced to the sludge treatment zones has a magnesium content less than 6.5 grams per liter (as MgO);
   wherein the separated aqueous sludge product is maintained between 15° and 21° C. during its flow along the maintained flow path through the sludge treatment zones;
   wherein the carbonated sludge product is maintained between 15° and 21° C. during the separating step (B);
   wherein the calcining step (E) is performed in a lime kiln; wherein the flue gases recovered from the lime kiln are scrubbed with water; and wherein the flue gases introduced in accord with step (A-2) are the scrubbed flue gases recovered from the lime kiln.

13. In a system for softening a water supply having a high magnesium content to remove soluble calcium and magnesium values therefrom and wherein the supply is treated with lime sufficient to precipitate calcium carbonate and magnesium hydroxide that are separated from the treated water supply as components of an aqueous sludge product, the process of treating the separated aqueous sludge product to recover the water component, calcium values and magnesium values of the separated aqueous sludge product comprising the steps of:
   A. carbonating the separated aqueous sludge product to solubilize the precipitated magnesium values of the separated sludge product in the aqueous component of the separated sludge product, thereby to provide a carbonated sludge product with residual solids that include the precipitated calcium carbonate with a liquid phase component that contains the solubilized magnesium values,
   B. separating the residual solids of the carbonated sludge product from the liquid phase component of the carbonated sludge product,
   C. calcining the precipitated calcium carbonate component of the separated residual solids in a lime kiln, and recovering the calcium values of the separated aqueous sludge product as a calcined lime product, D. decarbonating the separated liquid phase component to provide an aqueous slurry containing a hydrated form of precipitated magnesium carbonate and residual liquid that remains from the decarbonation of the separated liquid phase component, E. separating the hydrated form of precipitated magnesium carbonate of the aqueous slurry from said residual liquid, F. drying the separated hydrated form of precipitated magnesium carbonate, and recovering the magnesium values of the separated aqueous sludge product as a dried hydrated form of magnesium carbonate.

14. The process in accord with claim 13 wherein the carbonating step (A) comprises the steps of:

A-1. maintaining a flow path of the separated sludge product through a plurality of serially connected sludge treatment zones by continuously introducing progressively diminishing portions of the separated aqueous sludge product to successive sludge treatment zones along the path of the maintained flow, A-2. continuously introducing flue gases at the bottoms of each of the respective zones, A-3. continuously and intimately mixing the flue gases introduced in the respective treatment zones with the flowing aqueous sludge therein, A-4. continuously withdrawing the introduced gases remaining from the intimate mixture thereof with the flowing aqueous sludge from the tops of each of the respective zones, and A-5. continuously withdrawing the carbonated sludge product from the last of the treatment zones along the maintained flow path;

wherein the sludge treatment zones are maintained at substantially atmospheric pressure conditions;

wherein the separated aqueous sludge product introduced to the sludge treatment zones has a magnesium content less than 6.5 grams per liter (as MgO);

wherein the separated aqueous sludge product is maintained between 15° and 21° C. during its flow through the sludge treatment zones;

wherein the carbonated sludge product is maintained between 15° and 21° C. during the separating step (B);

wherein flue gases recovered from the lime kiln used in step (C) are scrubbed with water; and wherein the flue gases introduced in accord with step (A-2) are the scrubbed flue gases recovered from the lime kiln.

15. The process in accord with claim 14 wherein the intimately mixing with the flowing aqueous sludge of the introduced flue gases is accomplished in step (A-3) by mechanical means.

16. The process in accord with claim 13 wherein the decarbonating step (D) comprises the steps of:

D-1. heating the separated liquid phase component to a temperature in the range of 35° to 45° C., and D-2. passing air through the heated separated liquid phase component to precipitate normal magnesium carbonate and thereby provide said aqueous slurry; and additionally comprising the step of:

G. mixing the separated residual liquid with the separated aqueous sludge product before the carbonation of the separated aqueous sludge product.

17. The process in accord with claim 13 wherein the decarbonation step (D) comprises the step of:

D-1. heating the separated liquid phase component to a temperature in excess of 50° C. to precipitate basic magnesium carbonate and thereby provide said aqueous slurry; and additionally comprising the step of:

G. mixing the separated residual liquid with the water supply.

18. The process in accord with claim 13 comprising the further step of:

H. mixing calcined lime product obtained from the calcination step (C) with the water supply to provide lime for treating the water therein.

19. In a system for softening a turbid water having a high magnesium content to remove soluble calcium and magnesium values therefrom, the process of treating the turbid water to remove the soluble calcium and magnesium values and the turbidity factors therefrom and of recovering the water component, calcium values and magnesium values of an aqueous sludge product of the treatment accorded the turbid water comprising the steps of:

A. treating the turbid water with sufficient lime to form precipitated calcium carbonate and precipitated magnesium hydroxide in the water, said magnesium hydroxide flocculating the turbidity factors, B. settling the precipitates and flocculated turbidity factors in the lime treated water and in the absence of coagulants other than the precipitated magnesium hydroxide, thereby to form said aqueous sludge product and provide solids components in the aqueous sludge product that include the calcium carbonate and magnesium hydroxide precipitates and the turbidity factors, C. separating the formed aqueous sludge product from the lime treated water, D. carbonating the separated aqueous sludge product to solubilize the precipitated magnesium values of the separated sludge product in the aqueous component of the separated sludge product, thereby to provide a carbonated sludge product with a liquid phase component that contains the solubilized magnesium values and with residual solids that include the turbidity factors and the precipitated calcium carbonate, E. separating the liquid phase component of the carbonated sludge product from the residual solids of the carbonated sludge product, F. separating the included precipitated calcium carbonate from the included turbidity factors of the separated residual solids obtained from the separating step (E) and disposing of the separated turbidity factors as waste material, G. calcining the separated precipitated calcium carbonate obtained from step (E), and recovering the calcium values from the aqueous sludge product formed in step (B) as a calcined lime product, H. decarbonating the separated liquid phase component to provide an aqueous slurry containing a hydrated form of precipitated magnesium carbonate and residual liquid that remains from the decarbonation of the separated liquid phase component, I. separating the hydrated form of precipitated magnesium carbonate of the aqueous slurry from the residual liquid of the aqueous slurry, J. drying the separated hydrated form of precipitated magnesium carbonate, and recovering the magnesium values of the separated aqueous sludge product as a dried hydrated form of magnesium carbonate.

20. The process in accord with claim 19 wherein the turbidity factors and precipitated calcium carbonate of the separated residual solids are separated in step (F) by froth flotation procedures.

21. The process in accord with claim 20 comprising the further step of:
L. mixing a portion of the calcined lime product obtained from the calcining step (G) with the turbid water in the treating step (A) to provide lime for treating the turbid water.

22. The process in accord with claim 21 wherein the decarbonating step (H) comprises the steps of:
H-1. heating the separated liquid phase component to a temperature between 35° and 45° C.,
H-2. passing air through the heated separated liquid phase component to precipitate normal magnesium carbonate and thereby provide said aqueous slurry; and additionally comprising the step of:
K. mixing the separated residual liquid of the aqueous slurry with the separated aqueous sludge product before the carbonation of the separated aqueous sludge product.

23. The process in accord with claim 19 wherein the carbonating step (D) comprises the steps:
D-1. maintaining a flow path of the separated aqueous sludge product through a plurality of serially connected sludge treatment zones by continuously introducing progressively diminishing portions of the separated aqueous sludge product to successive treatment zones along the path of maintained flow,
D-2. continuously introducing scrubbed flue gases at the bottoms of each of the respective zones,
D-3. continuously and intimately mixing the flue gases introduced in the respective treatment zones with the flowing aqueous sludge therein,
D-4. continuously withdrawing the introduced gases remaining from the intimate mixture thereof with the flowing aqueous sludge from the tops of each of the respective zones, and
D-5. continuously withdrawing the carbonated sludge product from the last of the treatment zones along the maintained flow path; and
wherein the flowing aqueous sludge in the treatment zones is maintained under substantially atmospheric pressure conditions, wherein the separated aqueous sludge product introduced to the sludge treatment zone has a magnesium content less than 6.5 grams per liter (as MgO);
wherein the separated aqueous sludge product is maintained between 15° and 21° C. during its flow through the sludge treatment zones;
wherein the carbonated sludge product is maintained between 15° and 21° C. during the separation step (E);
wherein the calcining step (G) is performed in a lime kiln; wherein the flue gases recovered from the lime kiln are scrubbed with water; and
wherein the flue gases introduced in accord with step (D-2) are the scrubbed flue gases recovered from the lime kiln.

24. The process in accord with claim 23 wherein the turbidity factors and the precipitated calcium carbonate of the residual solids are separated in step (F) by froth flotation procedures.

25. The process in accord with claim 24 comprising the further step of:
L. mixing the calcined lime product obtained from the calcining step (G) with the turbid water in the treating step (A) to provide lime for treating the turbid water.

26. The process in accord with claim 24 wherein the decarbonating of step (H) comprises the steps of:
H-1. heating the separated liquid phase component to a temperature between 35° and 45° C.,
H-2. passing air through the heated separated liquid phase component to precipitate normal magnesium carbonate and thereby provide said aqueous slurry; and additionally comprising the step of:
K. mixing the separated residual liquid of the aqueous slurry with the separated aqueous sludge product before the carbonation of the separated aqueous sludge product.

27. In a system for softening a turbid water supply having a high magnesium content to remove soluble calcium values therefrom, the process of treating the turbid water supply to remove the turbidity factors therefrom and of recovering the water component, calcium values and magnesium values of an aqueous sludge product of the treatment accorded the turbid water supply comprising the steps of:
A. treating the turbid water supply with lime sufficient to form precipitated calcium carbonate and precipitated magnesium hydroxide in the turbid water supply, said magnesium hydroxide flocculating the turbidity factors,
B. settling the precipitates and the flocculated turbidity factors in the lime treated water supply and in the absence of coagulants other than the precipitated magnesium hydroxide, thereby to form said aqueous sludge product and provide solids components in the aqueous sludge product that include the calcium carbonate and magnesium hydroxide precipitates and the turbidity factors,
C. separating the formed aqueous sludge product from the lime treated water supply,
D. carbonating the separated aqueous sludge product to solubilize the precipitated magnesium values of the separated sludge product in the aqueous component of the separated sludge product, thereby to provide a carbonated sludge product with a liquid phase component that contains the solubilized magnesium values and with residual solids that include the turbidity factors and the precipitated calcium carbonate,
E. separating the liquid phase component of the carbonated sludge product from the residual solids of the carbonated sludge product,
F. mixing the separated liquid phase component with the water supply in the treating step (A), thereby recovering the water component and the magnesium values from the aqueous sludge product formed in the settling step (B),
G. separating the included precipitated calcium carbonate from the included turbidity factors of the separated residual solids obtained from the separating step (E) and disposing of the separated turbidity factors as waste material,
H. calcining the separated precipitated calcium carbonate obtained from the separating step (G), and recovering the calcium values from the aqueous sludge product formed in step (B) as a calcined lime product, and
I. mixing a portion of the calcined lime product obtained from the calcining step (H) with the turbid water supply in the treating step (A) to provide lime for treating the turbid water supply.

28. The process in accord with claim 27 wherein the turbidity factors and the precipitated calcium carbonate of the separated residual solids are separated in step (G) by froth flotation procedures.

29. The process in accord with claim 27 wherein the carbonating step (D) comprises the steps of:
D-1. maintaining a flow path of the separated sludge product through a plurality of serially connected sludge treatment zones by continuously introducing progressively diminishing portions of the separated aqueous sludge product to successive treatment zones along the path of maintained flow,
D-2. continuously introducing scrubbed flue gases at the bottoms of each of the respective zones,
D-3. continuously and intimately mixing the flue gases introduced in the respective zones with the flowing aqueous sludge therein,
D-4. continuously withdrawing the introduced gases remaining from the intimate mixture thereof with the flowing aqueous sludge from the tops of each of the respective zones, and
D-5. continuously withdrawing the carbonated sludge product from the last of the treatment zones along the maintained flow path; and wherein the flowing aqueous sludge in the treatment zones is maintained under substantially atmospheric pressure conditions; wherein the separated aqueous sludge introduced to the sludge treatment zones has a magnesium content less than 6.5 grams per liter (as MgO);

wherein the separated aqueous sludge product is maintained between 15° and 21° C. during its flow through the sludge treatment zones;

wherein the carbonated sludge product is maintained between 15° and 21° C. during the separating step (E);

wherein the calcining step (H) is performed in a lime kiln; wherein the flue gases recovered from the lime kiln are scrubbed with water; and wherein the flue gases introduced in accord with step (D-2) are the scrubbed flue gases recovered from the lime kiln.

30. The process of treating a turbid raw water supply having a low magnesium content to remove the turbidity factors therefrom and of recovering the water component and magnesium values of an aqueous sludge product of the treatment accorded the turbid water supply comprising the steps of:
A. treating the raw water supply with sufficient lime and a magnesium hydroxide forming reactant therewith to form an intimate mixture of precipitated calcium carbonate and precipitated magnesium hydroxide in the water supply, said magnesium hydroxide flocculating the turbidity factors,
B. settling the mixture of the precipitates and the flocculated turbidity factors in the lime treated water supply and in the absence of coagulants other than the precipitated magnesium hydroxide, thereby to form said aqueous sludge product and provide solids components in the aqueous sludge product that include the calcium carbonate and magnesium hydroxide precipitates and the turbidity factors,
C. separating the formed aqueous sludge product from the treated water supply,
D. carbonating the separated aqueous sludge product to solubilize the precipitated magnesium values of the separated aqueous sludge product in the aqueous component of the separated aqueous sludge product, thereby to provide a carbonated sludge product with a liquid phase component that contains the solubilized magnesium values and with residual solids that include the turbidity factors and the precipitated calcium carbonate,
E. separating the liquid phase component of the carbonated sludge product from the residual solids of the carbonated sludge product, and
F. mixing the separated liquid phase component with the water supply in the treating step (A) to provide a magnesium hydroxide reactant with the lime used in treating the turbid water supply in the treating step (A), thereby recovering the water component and magnesium values from the aqueous sludge product formed in the settling step (B).

31. A process of treating a turbid raw water supply to remove the turbidity factors therefrom and of recovering calcium values of an aqueous sludge product of the treatment accorded the turbid water supply comprising the steps of:
A. treating the turbid water supply with sufficient lime to form an intimate mixture of precipitated calcium carbonate and precipitated magnesium hydroxide in the turbid water, said magnesium hydroxide flocculating the turbidity factors,
B. settling the flocculated turbidity factors, the precipitated calcium carbonate and the precipitated magnesium hydroxide in the lime treated water and in the absence of alum, thereby to form said aqueous sludge product and provide solids components in the formed alum-free aqueous sludge product that include the calcium carbonate and magnesium hydroxide precipitates and the turbidity factors,
C. separating the formed alum-free aqueous sludge product from the lime treated water,
D. carbonating the separated alum-free aqueous sludge product to solubilize the precipitated magnesium hydroxide of the separated alum-free aqueous product in the aqueous sludge product in the aqueous component of the separated alum-free aqueous sludge product, thereby to provide a carbonated sludge product with a liquid phase component that contains the solubilized magnesium hydroxide and with residual solids that include the precipitated calcium carbonate and the turbidity factors,
E. separating the liquid phase component of the carbonated sludge product from the residual solids of the carbonated sludge product,
F. mixing the separated residual solids with water to form an aqueous slurry,
G. passing the formed aqueous slurry through a flotation unit to separate the turbidity factors of the formed aqueous slurry from the precipitated calcium carbonate of the formed aqueous slurry and disposing of the separated turbidity factors as a waste material, and
H. calcining the separated precipitated calcium carbonate in a lime kiln, and recovering the calcium values of the separated alum-free aqueous product as a calcined lime product;
said carbonating step (D) comprising the step of:

D-1. intimately mixing the separated alum-free aqueous sludge product with flue gases recovered from said lime kiln.

32. A process in accord with claim 31 comprising the further steps of:
I. decarbonating the separated liquid phase component to provide an aqueous slurry containing a hydrated form of precipitated magnesium carbonate and residual liquid that remains from the decarbonation of the separated liquid phase component,
J. separating the hydrated form of precipitated magnesium carbonate of the provided aqueous slurry from the residual liquid of the provided aqueous slurry, and
K. drying the separated hydrated form of precipitated magnesium carbonate, and recovering the magnesium carbonate;
said decarbonating step (I) comprising the step of:
I-1. heating the separated liquid phase component.

33. A process in accord with claim 32 comprising the further step of:
L. adjusting the temperature of the separated alum-free aqueous sludge product to between 15° and 21° C. prior to the carbonating step (D).

34. A process in accord with claim 33 comprising the further step of:
M. mixing the separated residual liquid with the turbid water supply in the treating step (A); and
wherein the alum-free aqueous sludge is maintained between 15° and 21° C. during the carbonating step (D),
wherein the carbonated sludge product is maintained between 15° and 21° C. during the separating step (E), and wherein the separated liquid phase component is heated to a temperature in excess of 50° C. during the decarbonating step (I) to precipitate basic magnesium carbonate.

35. A process in accord with claim 32 comprising the further steps of:
L. cooling the separated alum-free aqueous sludge product to between 15° and 21° C. prior to the carbonating step (D), and
M. mixing the separated residual liquid with the separated alum-free aqueous sludge.

36. A process in accord with claim 35 wherein the separated aqueous alum-free sludge is maintained between 15° and 21° C. during the carbonating step (D) wherein the carbonated sludge product is maintained between 15° and 21° C. during the separating step (E), wherein the separated liquid phase component is heated to a temperature in the range of from 35° to 45° C. during the heating step (I-1) to precipitate normal magnesium carbonate; and wherein the decarbonating step (I) includes the further step of:
I-2. passing air through the separated liquid phase component to strip carbon dioxide therefrom.

37. A process in accord with claim 31 comprising the further steps of:
I. scrubbing effluent flue gases derived from the lime kiln with water, and
J. passing the scrubbed effluent flue gases into intimate admixture with the separated alum-free aqueous sludge product during the intimately mixing step (D-1).

38. A process in accord with claim 31 comprising the further step of:
I. cooling the separated alum-free aqueous sludge product to between 15° and 21° C. prior to the carbonating step (D); and
wherein said carbonating step (D) comprises the further steps of:
D-2. maintaining a flow path of the separated alum-free aqueous sludge product through a plurality of serially connected aqueous sludge treatment zones by continuously introducing progressively diminishing portions of the cooled alum-free aqueous sludge product to successive sludge treatment zones along the path of the maintained flow,
D-3. continuously introducing the recovered lime kiln flue gases into the bottoms of each of the respective zones for the intimate mixture thereof with the flowing aqueous sludge in accord with step (D-1),
D-4. continuously withdrawing the introduced gases remaining from the intimate mixture thereof with the flowing aqueous sludge from the tops of each of the respective zones, and
D-5. continuously withdrawing the carbonated sludge product from the last of the treatment zones along the maintained flow path, and
wherein the intimately mixing step (D-1) is accomplished by mechanically dispersing the introduced flue gases in the flowing aqueous sludge in the respective treatment zones,
said separated alum-free aqueous sludge product being maintained between 15° and 21° C. during its flow through the sludge treatment zones, said carbonated sludge product being maintained between 15° and 21° C. during the separation step (E), said flowing aqueous sludge being maintained under substantially atmospheric pressure conditions during its flow through the treatment zones, and
said portions of the separated alum-free aqueous sludge product introduced to the treatment zones having magnesium content less than 6.5 grams per liter (as MgO).

39. A process in accord with claim 31 wherein the separated turbidity factors are recovered from the flotation unit in the passing step (G) as a component of an aqueous float;
wherein the separated precipitated calcium carbonate is recovered from the flotation unit in the passing step (G) as a component of a residual slurry that contains the insoluble precipitated calcium carbonate; and
wherein the process comprises the further steps of:
I. separating the insoluble precipitated calcium carbonate of the aqueous residual slurry from the aqueous component of the aqueous residual slurry, and
J. mixing the separated aqueous component of the aqueous residual slurry with the separated residual solids in the mixing step (F).

* * * * *

UNITED STATES PATENT AND TRADEMARK OFFICE
CERTIFICATE OF CORRECTION

PATENT NO. : 4,017,391
DATED : April 12, 1977
INVENTOR(S) : Alvin P. Black

It is certified that error appears in the above-identified patent and that said Letters Patent are hereby corrected as shown below:

In the drawings, Sheet 4, FIG. 4, the right hand arrow (on recycle line 159 below the chemical separation plant 151) should be deleted.

Column 1, line 35, after "sludge" "as such" should be -- . As such

Column 6, formula (1), underline "$\underline{2CaCO_3}$"
             (2), underline "$\underline{CaCO_3}$"
             (3), underline "$\underline{CaCO_3}$" and "$\underline{Mg(OH)_2}$"
             (4), underline "$\underline{Mg(OH)_2}$"
             (5), underline "$\underline{CaCO_3}$"
             (6), underline "$\underline{CaCO_3}$"

Column 12, line 55, "rew" should read -- raw --
Column 12, line 55, cancel "raw" and insert -- 26 --
Column 15, line 13, after "bonation" cancel the comma --,--
Colunm 15, line 30, change "53" to read -- 55 --
Column 18, line 45 change "$SiC_2$" to read --"$SiO_2$"--
Column 18, line 46, change "$Fe_2C_3$ to read --"$Fe_2O_3$" --

Signed and Sealed this

Fourteenth Day of February 1978

[SEAL]

Attest:

RUTH C. MASON
Attesting Officer

LUTRELLE F. PARKER
Acting Commissioner of Patents and Trademarks